United States Patent
Tsanaktsidis et al.

(10) Patent No.: US 12,479,785 B2
(45) Date of Patent: Nov. 25, 2025

(54) PREPARATION OF HALOGENATED ALKOXYETHANE

(71) Applicant: COMMONWEALTH SCIENTIFIC AND INDUSTRIAL RESEARCH ORGANISATION, Acton (AU)

(72) Inventors: John Tsanaktsidis, Acton (AU); Cecily Eldridge, Acton (AU); Scott Courtney, Scoresby (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 724 days.

(21) Appl. No.: 17/786,048

(22) PCT Filed: Dec. 19, 2019

(86) PCT No.: PCT/AU2019/051411
§ 371 (c)(1),
(2) Date: Jun. 16, 2022

(87) PCT Pub. No.: WO2021/119716
PCT Pub. Date: Jun. 24, 2021

(65) Prior Publication Data
US 2023/0041468 A1    Feb. 9, 2023

(51) Int. Cl.
*C07C 41/01* (2006.01)
*B01J 19/18* (2006.01)
*C07C 41/38* (2006.01)

(52) U.S. Cl.
CPC ........... *C07C 41/01* (2013.01); *B01J 19/1825* (2013.01); *C07C 41/38* (2013.01); *B01J 2219/00015* (2013.01); *B01J 2219/00033* (2013.01); *B01J 2219/00087* (2013.01); *B01J 2219/00166* (2013.01); *B01J 2219/0245* (2013.01)

(58) Field of Classification Search
CPC .................................................... C07C 41/01
See application file for complete search history.

(56) References Cited

U.S. PATENT DOCUMENTS

| 4,365,097 A | 12/1982 | Terrell et al. |
| 2023/0053833 A1 | 2/2023 | Tsanaktsidis et al. |

FOREIGN PATENT DOCUMENTS

| CS | 246644 B1 | 10/1986 |
| GB | 523449 A | 7/1940 |
| JP | 38-002854 B | 4/1963 |
| JP | 2007-039376 A | 2/2007 |
| JP | 2023-514798 A | 4/2023 |
| WO | WO-2017/222048 A1 | 12/2017 |
| WO | WO-2018/016377 A1 | 1/2018 |
| WO | WO-2021/119717 A1 | 6/2021 |

OTHER PUBLICATIONS

Machine translation of Patent No. CS246644B1, Oct. 16, 1986; pp. 1-3 (Year: 1986).*
Krasberg, N. et al. "Selection of Technical Reactor Equipment for Modular, Continuous Small-Scale Plants" Processes 2014, 2, 265-292; doi: 10.3390/pr2010265 (Year: 2014).*
Akwi et al., "Continuous flow chemistry: where are we now? Recent applications, challenges and limitations," Chem Commun (camb). 54(99):13894-13928 (Dec. 2018).
Hughes, David L., "Applications of Flow Chemistry in Drug Development: Highlights of Recent Patent Literature," Org PRocess Res Dev. 22(1):13-20 (Dec. 2017) (36 pages).
International Search Report for PCT/AU2019/051411, dated Feb. 20, 2020 (5 pages).
Plutschack et al., "The Hitchhiker's Guide to Flow Chemistry," Chem Rev. 117(18):11796-11893 (Sep. 2017).
Anonymous, "Methoxyflurane—an overview," ScienceDirect Topics. *The International Encyclopedia of Adverse Drug Reactions and Interactions*. (Jan. 1, 2008) (5 pages).
Cranwell et al., "Flow synthesis using gaseous ammonia in a Teflon AF-2400 tube-in-tube reactor: Paal-Knorr pyrrole formation and gas concentration measurement by inline flow titration," Org Biomol Chem. 10(30):5774-9 (Aug. 2012).
Extended European Search Report for European Patent Application No. 19956608.4 dated Aug. 16, 2023 (11 pages).
Ötvös et al., "Flow chemistry as a versatile tool for the synthesis of triazoles," Catal. Sci. Technol. 5(11):4926-41 (Nov. 2015).
Fuse, "Organic Synthesis Using Microflow Reactor," Journal of Synthetic Organic Chemistry. 70(2):81-82 (2012) (3 pages).

* cited by examiner

*Primary Examiner* — Medhanit W Bahta
(74) *Attorney, Agent, or Firm* — Clark & Elbing LLP

(57) ABSTRACT

A process for continuous preparation of halogenated alkoxyethane of general formula $XClHC\text{—}CF_2OR$, where X is —Cl or -f and OR is $C_{1-4}$ alkoxy, the process comprising a step of introducing in a flow reactor reaction components comprising (i) a compound of general formula $XClHC\text{—}CYF_2$, where each of X and Y is independently —Cl or —F, (ii) a base, and (iii) a $C_{1-4}$ alkanol, wherein a) the flow reactor comprises one or more tubular flow line(s) through which the reaction components flow as a reaction mixture, c) the halogenated alkoxyethane is formed at least upon the reaction components mixing, with the so formed halogenated alkoxyethane flowing out of the flow reactor in a reactor effluent, and b) the base is one that forms a salt soluble in the alkanol during formation of the halogenated alkoxyethane.

19 Claims, 6 Drawing Sheets

(a)

(b)

PREPARATION OF HALOGENATED ALKOXYETHANE

FIELD OF THE INVENTION

The present invention relates in general to continuous preparation of halogenated alkoxyethane, and in particular to a process for continuous preparation of halogenated alkoxyethane of general formula XClHC—CF$_2$OR, where X is —Cl or —F and OR is C$_{1-4}$ alkoxy.

BACKGROUND

Halogenated alkoxyethane compounds constitute a significant fraction of present day active pharmaceutical ingredients, not to mention agrochemicals, dyes, flame retardants, and imaging agents.

Synthesis of halogenated alkoxyethane compounds for use as active pharmaceutical ingredients requires reproducible pharmaceutical grade compounds. Conventionally, halogenated alkoxyethane compounds are produced through batch procedures, the quality per batch can be variable and can require the use of high pressure equipment. Current batch procedures are generally plagued by poor and inhomogeneous reagent mixing, necessitating long reaction times for relatively low conversion yields. As a result, conventional synthesis of halogenated alkoxyethane compounds almost inevitably requires costly post-processing purification procedures to ensure that a pharmaceutical grade compound is produced at a commercially relevant scale.

In addition, heat control in conventional batch procedures is particularly challenging because reactions to form halogenated alkoxyethane compounds are highly exothermic. Potential formation of toxic and highly reactive intermediates and by-products (e.g. halogen halides) also pose significant safety and waste management challenges.

In contrast to conventional batch procedures, continuous production using semi-batch or semi-continuous arrangements can afford higher yield relative to conventional batch procedures. However, uncontrolled precipitation of reaction by-products imposes frequent de-clogging and cleaning of the reactor lines, which disrupts the continuity of those processes. In addition, those alternative arrangements do not fully address the challenges of conventional batch processes in terms of thermal control, safety, waste management, high reaction times, and low conversion yield.

Accordingly, there remains an opportunity to ameliorate problems and limitations associated with conventional procedures for the synthesis of halogenated alkoxyethane compounds.

SUMMARY OF THE INVENTION

A first aspect of the invention relates to a process for continuous preparation of halogenated alkoxyethane of general formula XClHC—CF$_2$OR, where X is —Cl or —F and OR is C$_{1-4}$ alkoxy, the process comprising a step of introducing in a flow reactor reaction components comprising (i) a compound of general formula XClHC—CYF$_2$, where each of X and Y is independently —Cl or —F, (ii) a base, and (iii) a C$_{1-4}$ alkanol, wherein a) the flow reactor comprises one or more tubular flow line(s) through which the reaction components flow as a reaction mixture,
 b) the halogenated alkoxyethane is formed at least upon the reaction components mixing, with the so formed halogenated alkoxyethane flowing out of the flow reactor in a reactor effluent, and
 c) the base is one that forms a salt soluble in the alkanol during formation of the halogenated alkoxyethane.

By the present invention, the reaction components can be continuously introduced into the flow reactor and converted therein into a reactor effluent containing the target halogenated alkoxyethane. The effluent continuously flows out of the reactor and is available for further processing and/or purification, if needed. The continuous nature of the process advantageously enables halogenated alkoxyethane to be produced in commercial quantities.

In accordance with the first aspect of the invention, the base is one that forms a salt soluble in the alkanol during formation of the halogenated alkoxyethane. This advantageously minimises formation of insoluble precipitates along the tubular flow line(s). As a result, the flow reactor can be operated without interrupting fluid flow through the line(s) for long periods. In addition, cleaning is less frequent and less onerous relative to conventional systems, resulting in significant cost savings.

In some embodiments, the one or more tubular flow line(s) have an internal cross-sectional area of less than 115 mm$^2$. By comprising one or more tubular flow line(s) having an internal cross-sectional area of less than 115 mm$^2$, the flow reactor of the invention ensures high heat exchange efficiency due to high specific surface area of the tubular flow lines. In addition, the specific arrangement of one or more tubular flow line(s) through which the reaction components flow as a reaction mixture affords fast and thorough mixing of the reaction components, leading to significant improvement over conventional procedures in terms of reaction time and conversion yield.

In view of the above mentioned advantages, it is believed that a process for the continuous preparation of halogenated alkoxyethane using a flow reactor comprising one or more tubular flow line(s) having an internal cross-sectional area of less than 115 mm$^2$ is unique in its own right.

Accordingly, a second aspect of the invention relates to a process for continuous preparation of halogenated alkoxyethane of general formula XClHC—CF$_2$OR, where X is a —Cl or —F and OR is C$_{1-4}$ alkoxy, the process comprising a step of introducing in a flow reactor reaction components comprising (i) a compound of general formula XClHC—CYF$_2$, where each of X and Y is independently —Cl or —F, (ii) a base, and (iii) a C$_{1-4}$ alkanol, wherein a) the flow reactor comprises one or more tubular flow line(s) having an internal cross-sectional area of less than 115 mm$^2$ through which the reaction components flow as a reaction mixture, and b) the halogenated alkoxyethane is formed at least upon the reaction components mixing, with the so formed halogenated alkoxyethane flowing out of the flow reactor in a reactor effluent. In the context of the second aspect of the invention, the base may or may not be one that forms a salt soluble in the alkanol during formation of the halogenated alkoxyethane.

Relative to conventional systems, the tubular flow line(s) in the flow reactor of the invention provide a much more controlled environment for reaction, making the flow reactor inherently safer to operate and affording the production of a purer product relative to conventional apparatuses. In that context, extreme conditions of temperature and pressure are readily implemented in the reactor of the invention to boost chemical reactivity, yet keeping full control on process parameters.

Thus, high reaction selectivity and enhanced safety can be achieved even for very fast and highly exothermic reactions involved in the formation of the target halogenated alkoxyethane. The excellent heat and mass transfer characteristics afforded by the small-section tubular flow lines, together with the fact that the reaction is resolved along the length of the reaction channel, enables a precise control of the residence time of intermediates or products by a thermal or chemical quench of the solution.

Further, the controlled environment for reaction afforded by the small-section tubular flow lines ensures that formation of hazardous chemicals can be easily controlled. Toxic substances can be readily quenched in line, thus avoiding any undesired exposures and significantly enhancing process safety.

In some embodiments, the one or more tubular flow line(s) has/have an internal cross-sectional area of less than 30 mm². For example, the one or more tubular flow line(s) may have an internal cross-sectional area of about 28 mm². Those embodiments can provide an advantageous compromise between good thermal control and safety, low reaction times, high conversion yields, and high scale-up potential for the high throughput production of pharmaceutical grade halogenated alkoxyethanes.

In some embodiments, the one or more tubular flow line(s) has/have an internal cross-sectional area of less than 5 mm², which further improves the degree of mixing of the reactor components, which enhances the aforementioned advantages in terms of thermal control and safety, efficient waste management, low reaction times, and high conversion yields.

According to some particularly advantageous arrangements, the one or more tubular flow line(s) have a circular internal cross-section. In some embodiments, the tubular flow line(s) having a circular internal cross-section have a diameter between 0.1 and 6 mm, for example 0.1 and 2 mm. These arrangements are particularly effective to obtain efficient mixing of the reaction components, further reduce reaction time and increasing conversion yield.

Despite the small scale of each tubular flow line, the reactor can readily be operated with multiple tubular flow lines making the scale up to large production quantities relatively straight forward. As a result, scale-up can be performed with minimal to no re-optimisation of the reaction conditions. In this context, it can be more effective and efficient to merely "number-up" the tubular flow lines to produce a given quantity of halogenated alkoxyethane compared with developing a single macro-flow line to produce the same amount of halogenated alkoxyethane. While a process in accordance with the present invention can be performed to produce small quantities of halogenated alkoxyethane (e.g. fraction of grams per day) by using one flow line, the flow lines can be readily "numbered-up" to produce more commercially relevant amounts of halogenated alkoxyethane (e.g. from several grams to several kilos per day), yet maintaining identical standards of safety, product purity, reaction time, reaction yield, and safety.

The process of the invention is also particularly advantageous for the production of commercially relevant halogenated alkoxyethane compounds.

For example, in some embodiments the compound of general formula XClHC—CYF$_2$ is Cl$_2$HC—CF$_3$ (i.e. X is —Cl and Y is —F). In those instances, the process of the invention allows for the efficient and scalable production of halogenated alkoxyethane compounds such as methoxyflurane (Cl$_2$HC—CF$_2$OCH$_3$), which can be obtained when the C$_{1-4}$ alkanol is methanol. Given its high reaction yield, the process can afford facile and large yield synthesis of pharmaceutical grade methoxyflurane.

In some embodiments, the compound of general formula XClHC—CYF$_2$ is FClHC—CF$_3$ (i.e. both X and Y are —F). In those instances, the process of the invention affords efficient and scalable production of ClFHC—CF$_2$OCH$_3$, which can be obtained when the C$_{1-4}$ alkanol is methanol. The possibility to produce highly pure and high amounts of ClFHC—CF$_2$OCH$_3$ can be particularly advantageous, since that compound is a known precursor in the synthesis of 2-chloro-1,1,2-trifluoroethyl-difluoromethyl ether (enflurane) according to a procedure described herein.

Further aspects and embodiments of the invention are discussed in more detail below.

BRIEF DESCRIPTION OF THE DRAWINGS

The invention will also be described herein with reference to the following non-limiting drawings in which.

DETAILED DESCRIPTION OF THE INVENTION

Figure 1:
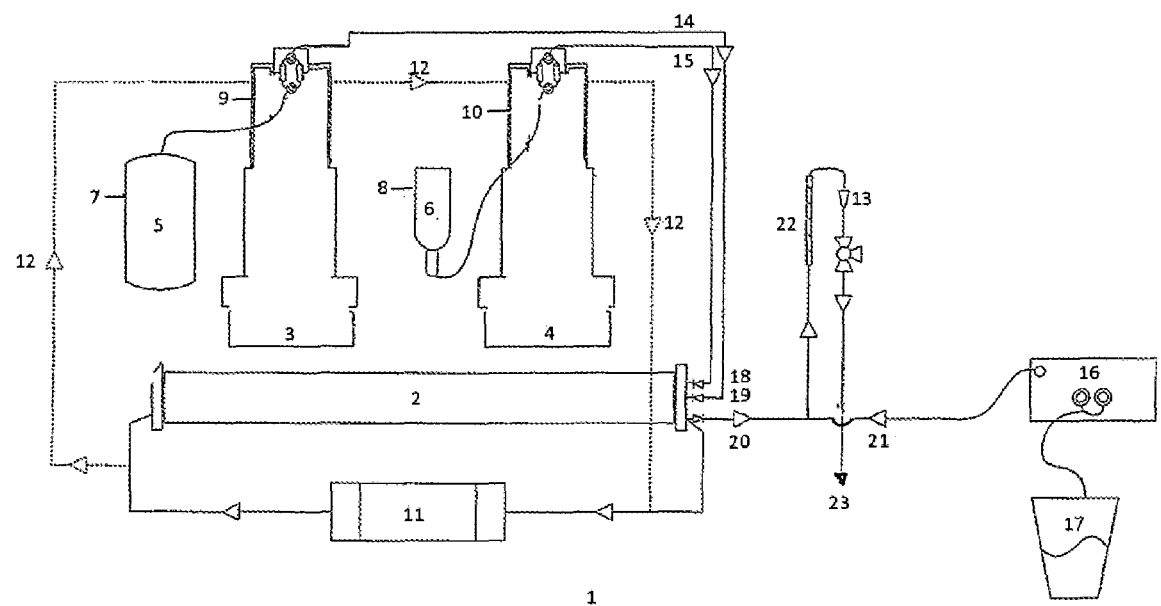
FIG. 1 shows an example of a suitable setup for the continuous production of halogenated alkoxyethane compounds in accordance with an embodiment of the present invention.

The process of the invention is one for continuous preparation of halogenated alkoxyethane of general formula XClHC—CF$_2$OR, where X is —Cl or —F and OR is C$_{1-4}$ alkoxy.

As used herein, the expression "C$_{1-4}$ alkoxy" denotes a straight chain or branched alkoxy group having from 1 to 4 carbons. Examples of straight chain and branched alkoxy include methoxy, ethoxy, n-propoxy, isopropoxy, n-butoxy, sec-butoxy, and t-butoxy.

In some embodiments, X is —Cl and OR is a methoxy group, in which case the halogenated alkoxyethane has a formula Cl$_2$HC—CF$_2$OCH$_3$ (methoxyflurane).

In some embodiments, X is —F and OR is a methoxy group, in which case the halogenated alkoxyethane has a formula FClHC—CF$_2$OCH$_3$. Such compound is a known precursor for the synthesis of 2-chloro-1,1,2-trifluoroethyl-difluoromethyl ether (enflurane).

The process of the invention is one for the continuous preparation of the halogenated alkoxyethane, and is based on the use of a continuous flow reactor. By the preparation being "continuous" is meant that the halogenated alkoxyethane forms continuously as the reactor components are mixed and flow through the tubular flow lines. As such, the so-formed halogenated alkoxyethane can be collected from the effluent that exits the flow reactor continuously.

By a "flow reactor" is meant that the reactor is designed to enable (1) continuous introduction of the reaction components into the one or more tubular flow line(s) through which they flow as a reaction mixture, and (2) continuous flow out of the reactor of an effluent containing the halogenated alkoxyethane.

The flow reactor used in the process of the invention comprises one or more tubular flow line(s). By the expression "tubular flow line" is meant an elongated hollow tube that allows internal fluid flow along its main length.

In some embodiments, the flow reactor comprises one tubular flow line. In those embodiments, a singular tubular flow line connects an inlet and an outlet of the flow reactor.

In some embodiments, the flow reactor comprises two or more tubular flow lines. For example, the flow reactor may comprise two or more tubular flow lines in a parallel-flow arrangement. By "parallel-flow" arrangement is meant that fluid enters each tubular flow line at the same end of the reactor, flows within each line along the same direction, and leaves each tubular flow line at the same end of the reactor. Advantageously, these embodiments enable the straightforward scale-up of reactor output by merely increasing the number of tubular flow lines, with no need to re-optimise reaction conditions. In those embodiments, the flow reactor may have a single inlet and a single outlet for the introduction of the reactor components (or the reaction mixture) and extraction of the reactor effluent, respectively. The reactor may therefore be provided with an internal arrangement that enables the fluid flowing from the single inlet to be distributed/subdivided across each single flow line, then collected at the other end to exit the reactor as a single effluent line.

In some embodiments of the first aspect of the invention, or in the second aspect of the invention, the tubular flow line (or each one of the two or more tubular flow lines) has an internal cross-sectional area of less than 115 mm$^2$. For example, the tubular flow line(s) may have an internal cross-sectional area of less than about 100 mm$^2$, less than about 50 mm$^2$, less than about 25 mm$^2$, less than 10 mm$^2$, or less than 5 mm$^2$. For avoidance of doubt, by "internal" cross-sectional area is meant herein the cross-sectional area through which a fluid flows within the tubular flow line.

In some embodiments of the first aspect of the invention, or in the second aspect of the invention, the tubular flow line (or each one of the two or more tubular flow lines) has an internal cross-sectional area of less than about 30 mm$^2$. For example, the tubular flow line(s) (or each one of the two or more tubular flow lines) may have an internal cross-sectional area of from about 0.2 mm$^2$ to about 30 mm$^2$. In some embodiments, the one or more tubular flow line(s) has/have an internal cross-sectional area of about 28 mm$^2$. Those dimensions provide a particularly advantageous combination of effective mixing of the reaction mixture and specific surface area for effective thermal control. For example, tubular flow line(s) of any of those sizes are sufficiently large to accommodate a static mixer, yet provide an adequately large specific surface area for effective thermal control. The resulting reactor represents therefore an advantageous platform for scale-up.

As used herein, the term "about", when referring to a value or to an amount of mass, weight, time, volume, concentration, percentage, and the like can encompass variations of, and in some embodiments, ±20%, in some embodiments ±10%, in some embodiments ±5%, in some embodiments ±1%, in some embodiments ±0.5%, and in some embodiments ±0.1%, from the specified amount.

Advantageously, the continuous synthesis of halogenated alkoxyethane in one or more tubular flow line(s) of the kind described herein is more efficient than a corresponding synthesis performed in batch system according to conventional procedures. In that regard, fluid behaviour in a fluidic system of the kind described herein differs significantly from fluid behaviour in macroscopic environments. While fluid dynamics in macroscopic environments is mostly dominated by pressure and gravity, in the flow reactor of the invention surface tension, energy dissipation and fluidic resistance start to determine the fluid dynamics. In addition, mixing efficiency afforded by the one or more tubular flow line(s) of the kind described herein is superior to that of conventional processes.

It is particularly advantageous to use a tubular flow line(s) having an internal cross-sectional area of less than 5 mm$^2$. When the tubular flow line(s) has an internal cross-sectional area of less than 5 mm$^2$, homogeneity of the reaction mixture flowing through the line(s) is advantageously high due to increased mixing efficiency of the reaction components achievable within the flow line. In addition, by having a small cross-sectional area, the tubular flow line(s) are characterised by a significantly high surface-to-volume ratio. As a result, heat transfer (and therefore thermal control) is facilitated.

The internal cross-sectional area of the one or more the tubular flow line(s) may have any geometry. Examples of suitable geometries of the internal cross-sectional area include a circular geometry, a square geometry, a rectangular geometry, a triangular geometry, or any other geometry known in the art. This may be achieved by using round tubing and/or square tubing of the kind that would be known to the skilled person.

In some embodiments, the tubular flow line(s) has a circular internal cross-section geometry. By having a "circular" geometry, the internal cross-section of the line(s) has a round shape characterised by an average internal diameter. For example, the internal cross-section may have the shape of a circle.

The average internal diameter of a tubular flow line that forms such flow reactors may range between 0.1 and 12 mm. The reaction tube diameter (internal) may typically be greater than or equal to 0.2 mm but less than 12 mm (and including any integer there between, and/or fraction thereof, for example, 0.2 mm, 0.3 mm, 0.4 mm, 0.5 mm, and so on). In one embodiment, the reaction tube diameter is greater than or equal to 2 mm but less than or equal to 10 mm. In one embodiment the reaction tube diameter is greater than or equal to 2 mm but less than or equal to 8 mm.

In some embodiments, the average internal diameter of the tubular flow line(s) is about 6 mm. Those dimensions provide a particularly advantageous combination of effective mixing of the reaction mixture and specific surface area for effective thermal control. For example, tubular flow line(s) of any of those sizes are sufficiently large to accommodate a static mixer of the kind described herein, yet provide an adequately large specific surface area for effective thermal control. As a result, the reactor can be operated to provide particularly high yields of halogenated alkoxyethane. The resulting reactor represents therefore an advantageous platform for scaled-up production of pharmaceutical grade halogenated alkoxyethane.

In some embodiments, the flow reactor comprises one or more tubular flow line(s) having an internal diameter of no more than about 2 mm, for example of no more than about 1 mm, no more than about 0.5 mm, or no more than 0.1 mm.

A particular advantage offered by such flow reactors is their high surface area to volume ratio, which can range from about 1,000 to well over 20,000 m$^2$/m$^3$. This contrasts significantly with the surface area to volume ratio provided by conventional batch reactors which is usually in the order of hundreds of m$^2$/m$^3$. As a result of the high surface area to volume ratio, such flow reactors offer excellent heat transfer across the flow line wall, allowing for efficient and fast cooling of exothermic reactions and quasi-isothermal process control.

Accordingly, one or more tubular flow line(s) may be dimensioned to provide a specific surface area (m$^2$/m$^3$) in the range of 100 to 40,000 m$^2$/m$^3$, 200 to 30,000 m$^2$/m$^3$, 300 to 20,000 m$^2$/m$^3$, 500 to 15,000 m$^2$/m$^3$, or 12,000 to 10,000 m$^2$/m$^3$. In some embodiments, the specific surface area is at least 100 m$^2$/m$^3$, at least 200 m$^2$/m$^3$, at least 300 m$^2$/m$^3$, at least 400 m$^2$/m$^3$, at least 500 m$^2$/m$^3$, at least 750 m$^2$/m$^3$, at least 1,000 m$^2$/m$^3$, at least 2,000 m$^2$/m$^3$, at least 3,000 m$^2$/m$^3$, at least 4,000 m$^2$/m$^3$, at least 5,000 m$^2$/m$^3$, at least 7,500 m$^2$/m$^3$, at least 10,000 m$^2$/m$^3$, at least 12,500 m$^2$/m$^3$, at least 15,000 m$^2$/m$^3$, at least 17,500 m$^2$/m$^3$, or at least 20,000 m$^2$/m$^3$. It will be appreciated that the specific surface areas can be measured by a number of techniques and assembled in a number of configurations suitable for industrial scale synthesis.

In addition, the mixing efficiency of the reaction mixture flowing through the tubular lines is improved when the internal diameter of the tubular flow line(s) is 8 mm or less, for example 6 mm. In those cases, the flow reactor may comprise one or more tubular flow line(s) having an internal diameter ranging from about 0.1 mm to about 8 mm, or about 1 mm to about 6 mm. In yet a further embodiment the flow reactor comprises one or more tubular flow line(s) having an internal diameter of about 6 mm. The dimension may be varied depending on the throughput scale desired. Effective mixing using tubular flow line(s) of those dimensions may be achieved with or without a static mixer of the kind described herein. In some embodiments, the one or more tubular flow line(s) comprise a static mixer located within the line(s).

Figure 2:
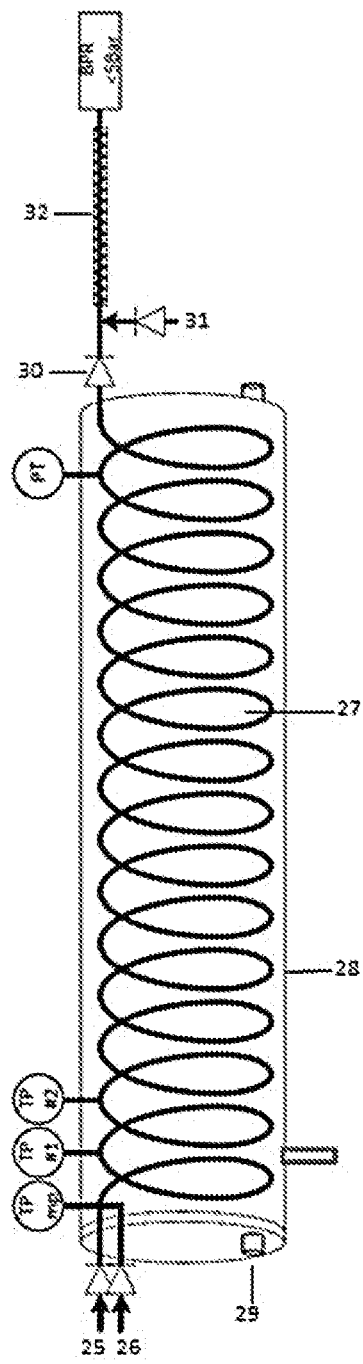
FIG. 2 shows a cut-away side view of a tubular flow line arrangement according to an embodiment of the present invention.
Figure 3:
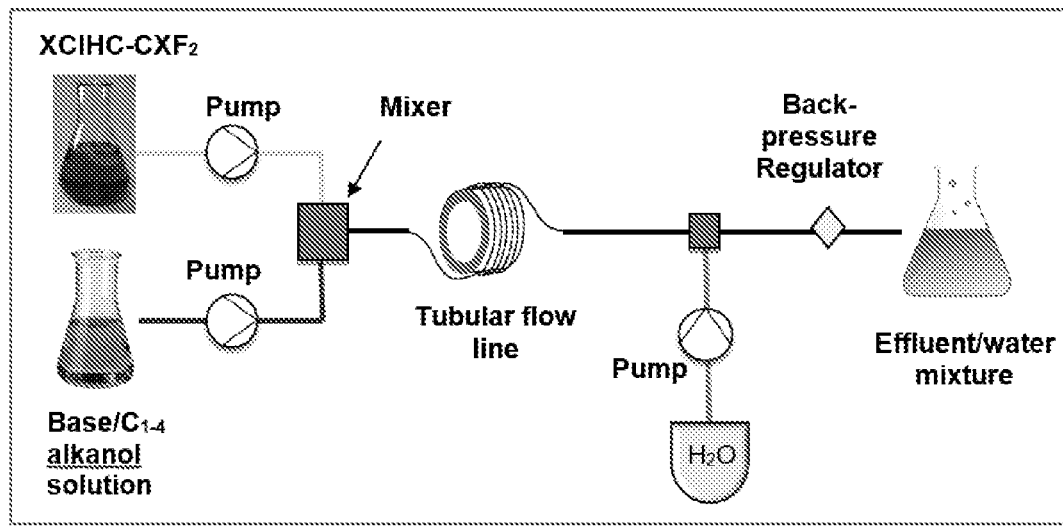
FIG. 3 shows a schematic of (a) a suitable setup for the continuous production of halogenated alkoxyethane compounds in accordance with an embodiment of the present invention, and (b) a corresponding example setup for the continuous production of methoxyflurane.
Figure 3:
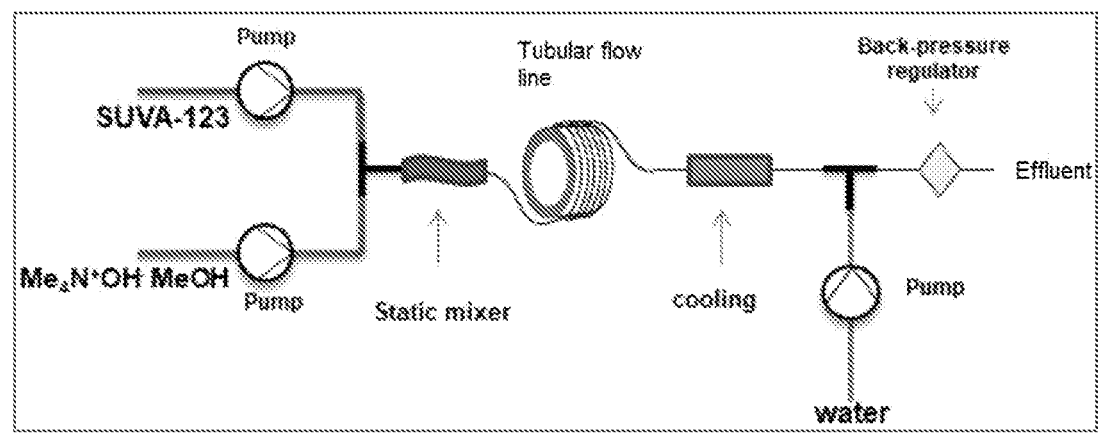

In some embodiments, the one or more tubular flow line(s) are provided in a coiled arrangement. Having the flow line(s) in a coiled arrangement (for example as shown in FIGS. 2-3) can provide for a more compact reactor, as well as facilitating thermal control of the line(s) through smaller thermal control systems. In addition, a coiled arrangement of the tubular flow line(s) may provide different mixing dynamics relative to, for instance, a straight arrangement. For example, flow in a coiled arrangement may be characterised by additional turbulence, in turn providing enhanced mixing. As a result, static mixers within the line(s) may not be needed to achieve efficient mixing, further reducing accumulation locations for salt precipitates. In addition, a coiled arrangement may help minimising clogging of the line(s) due to formation of insoluble reaction by-products and/or impurities.

The one or more tubular flow line(s) may have an internal surface made of a material that is chemically inert to the reaction components, the halogenated alkoxyethane, and any reaction intermediate or by-product. In that regard, the tubular flow line(s) itself may be made of said material, or have an internal lining made of said material. Further, the material the tubular flow line(s) is made or (or internally lined with) should be of suitable strength and structural integrity to withstand the flow rate pressure(s) and volume(s) of fluid passing through it.

Depending on the nature of the reaction components flowing through the line(s), metals, alloys and polymers are particularly preferred as the internal surface material of the tubular flow line(s). Exemplary suitable materials for use in the tubular flow line(s) may include polyethylene, polypropylene, polyvinyl chloride, a fluorocarbon (e.g. Teflon, polytetrafluoroethylene, polyvinylidene fluoride, fluorinated ethylene propylene, ethylene chlorotrifluoroethylene, polyvinylidene difluoride, a perfluoroalkoxy alkane, etc.), polyether ether ketone, polyethylene, fiberglass-reinforced plastic, Ni-based alloy, or No—Mo-based alloy. The skilled person would be readily capable to identify other materials suitable for use as the internal surface material of the tubular flow line(s) in the invention.

While the above discussion is made in the context of materials used to make (or internally line) the one or more tubular flow line(s), it will be understood that similar considerations apply to the material used to make (or internally line/coat) any element (or part thereof) of the system/apparatus used to perform the process and that is expected to come into contact with any one of the reaction components, product, intermediate, by-product(s), and/or mixture thereof. That is, it will be understood that any element (or part thereof) of the system/apparatus used to perform the process that is expected to come into contact with any one of the reaction components, product, intermediate, by-product(s), and/or mixture thereof would have to be made of a material that is chemically inert to said reaction component, product, intermediate, by-product(s) (which may include strong acids such as HCl or HF), and/or mixture thereof. Accordingly, any such element(s) may be made (or lined with, as appropriate) by a material of the kind described herein.

For example, any reservoir that is part of the system/apparatus used to perform the process may be made of (or internally lined with) a material that is chemically inert to the chemical component or mixture the reservoir is intended to store. Similarly, relevant components of pumps which may be used to pump a reaction component, product, intermediate, by-product(s), and/or any mixture thereof may be made of a material that is chemically inert to said reaction component, product, intermediate, by-product(s), and/or mixture thereof. Also, relevant components of mixing units of the kind described herein which may come into contact with a reaction component, product, intermediate, by-product(s), and/or any mixture thereof may be made of a material that is chemically inert to said reaction component, product, by-product(s), and/or mixture thereof. Examples of suitable materials in that regard include polyethylene, polypropylene, polyvinyl chloride, a fluorocarbon (e.g. Teflon, polytetrafluoroethylene, polyvinylidene fluoride, fluorinated ethylene propylene, ethylene chlorotrifluoroethylene, polyvinylidene difluoride, a perfluoroalkoxy alkane, etc.), polyether ether ketone, polyethylene, fiberglass-reinforced plastic, Ni-based alloy, or No—Mo-based alloy. The skilled person would be readily capable to identify other materials suitable for use in any of the components of the reactor to ensure safe handling of all mixtures and compounds involved in the invention.

The process of the invention comprises a step of introducing in a flow reactor reaction components comprising (i) a compound of general formula XClHC—CYF$_2$, where each of X and Y is independently —Cl or —F, (ii) a base, and (iii) a C$_{1-4}$ alkanol.

The compound of general formula XClHC—CYF$_2$ may be any compound of that formula in which each of X and Y is independently one of a chloro (—Cl) or fluoro (—F) group. In some embodiments, X is —Cl and Y is a —F, in which case the compound of general formula XClHC—CYF$_2$ is Cl$_2$HC—CF$_3$. In some embodiments, both X and Y are —F, in which case the compound of general formula XClHC—CYF$_2$ is FClHC—CF$_3$.

The C$_{1-4}$ alkanol may be any C$_{1-4}$ alkanol that can promotes addition of a C$_{1-4}$ alkoxy group to the second carbon of the compound of general formula XClHC—CYF$_2$. Without wanting to be limited by theory, it is believed that such addition is made possible by the formation of a C=C intermediate during the reaction, which is exposed to almost instantaneous alkanol addition. In particular, it is believed that in a first reaction step the base enables dehydrogenation and dehalogenation of the first and second carbons of the compound of general formula XClHC—CYF$_2$, respectively, resulting in formation of a C=C intermediate of general formula XClC=CF$_2$. Almost immediately upon formation, in a second reaction step the C=C intermediate undergoes a base-catalysed alkanol addition. This results in the formation of the halogenated alkoxyethane of general formula XClHC—CF$_2$OR, in which R is the C$_{1-4}$ alkoxy group bonded on the second carbon resulting from the alkanol addition.

In some embodiments, the C$_{1-4}$ alkanol is selected from methanol (CH$_3$OH), ethanol (CH$_3$CH$_2$OH), 1-propanol (CH$_3$CH$_2$CH$_2$OH), 2-propanol ((CH$_3$)$_2$CHOH), 1-butanol (CH$_3$CH$_2$CH$_2$CH$_2$OH), 2-butanol (CH$_3$CH$_2$CHOHCH$_3$), 2-methyl-1-propanol ((CH$_3$)$_2$CHCH$_2$OH), 2-methyl-2-propanol ((CH$_3$)$_3$COH), and a combination thereof. In some embodiments, the C$_{1-4}$ alkanol is methanol.

The base may be any base that can catalyse the addition reaction of the C$_{1-4}$ alkanol in accordance with a postulated two-step mechanism outlined herein. For example, the base may be any base that can (i) promote dehydrogenation and dehalogenation of the first and second carbons of the compound of general formula XClHC—CYF$_2$, and (ii) catalyse alkanol addition to the second carbon.

In some embodiments, the base comprises an alkali metal base cation. For example, the base may be selected from the group consisting of an alkali metal (e.g. Li, Na and K), an alkali metal salt (e.g. carbonates, acetates and cyanides), an alkali metal hydroxide, an alkali metal alkoxide (e.g. methylate, ethylate, phenolate), and a combination thereof. For example, the base may be selected from sodium methoxide, and potassium methoxide. In some embodiments, the base is an alkali metal hydroxide of general formula M-OH, wherein M is an alkali metal selected from the group consisting of Li, Na and K. In some embodiments, the alkali metal hydroxide is NaOH or KOH. In some embodiments, the base is KOH.

In some embodiments, the base comprises an ammonium or phosphonium base cation. Examples of suitable such bases include tetrabutylammonium hydroxide, benzyl(trimethyl)ammonium hydroxide, N-methyl-N,N,N-trioctylammonium chloride (Aliquat 336), tetraethylammonium hydroxide, tetramethylammonium hydroxide, and tetramethylphosphonium hydroxide.

In the first aspect of the invention, or in embodiments of the second aspect of the invention, the base is one that forms a salt soluble in the alkanol during formation of the halogenated alkoxyethane. This advantageously minimises formation of insoluble precipitates along the tubular flow line(s). As a result, the flow reactor can be operated without interrupting fluid flow through the line(s) for significantly longer times relative to conventional procedures. In addition, line cleaning is less frequent and less onerous, resulting in significant cost savings.

Examples of salt intermediates which may be expected to form during the reaction include salts of an alkali metal (e.g. sodium salts, potassium salts), or halide salts (e.g. chloride, fluoride salts). In this context, an intermediate salt would be considered "soluble" in the C$_{1-4}$ alkanol if the salt does not crystallise and precipitate under the reaction conditions. For example, an intermediate salt may be considered "soluble" in the C$_{1-4}$ alkanol if its solubility in the C$_{1-4}$ alkanol is at least 0.5 wt % under the reaction conditions.

Suitable examples of bases that can form salt that is soluble in the alkanol include a base comprising an ammonium or phosphonium base cation, such as one selected from tetrabutylammonium hydroxide, benzyl(trimethyl)ammonium hydroxide, N-methyl-N,N,N-trioctylammonium chloride (Aliquat 336), tetraethylammonium hydroxide, tetramethylammonium hydroxide, and tetramethylphosphonium hydroxide.

For example, when the compound of general formula XClHC—CYF$_2$ is Cl$_2$HC—CF$_3$ (HCFC-123), the base may be selected from tetrabutylammonium hydroxide, benzyl(trimethyl)ammonium hydroxide, N-methyl-N,N,N-trioctylammonium chloride, tetraethylammonium hydroxide, and tetramethylammonium hydroxide.

In certain embodiments, water is mixed with the C$_{1-4}$ alkanol to assist with the solubility of intermediate salts that form during the reaction.

In some embodiments, the compound of general formula XClHC—CYF$_2$ is Cl$_2$HC—CF$_3$ (HCFC-123) and the C$_{1-4}$ alkanol is methanol. In those instances, the process of the invention allows for the efficient and scalable production of halogenated alkoxyethane compounds such as methoxyflurane (Cl$_2$HC—CF$_2$OCH$_3$), for example in accordance with the reaction mechanism outlined in Scheme 1 below.

Scheme 1 Proposed 2-step reaction mechanism of methoxyflurane from HCFC-123

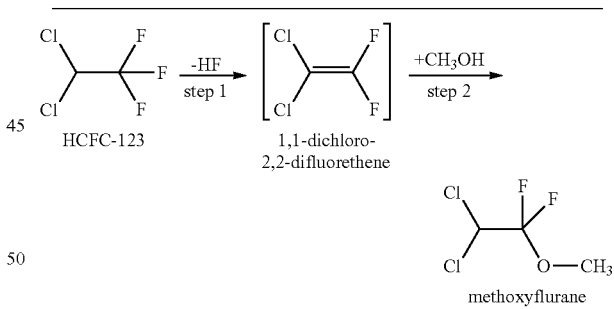

In the scheme above, 1,1-dichloro-2,2-difluoroethene is the synthesis intermediate that forms from the reaction between 2,2-dichloro-1,1,1-trifluoroethane (HCFC-123) and a suitable base (step 1), thereby resulting in the elimination of hydrogen fluoride (HF). Formation of methoxyflurane (2,2-dichloro-1,1-difluoro-1-methoxyethane) involves the base-catalysed addition of methanol to the intermediate 1,1-dichloro-2,2-difluoroethene (step 2). The purpose of the base in step 2 is to generate equilibrium concentrations of methoxide anion from the methanol by deprotonating the methanol.

This is particularly advantageous since methoxyflurane is the active ingredient of Penthrox®, which is an effective and rapid-onset short-term analgesic for the initial management of acute trauma pain and brief painful procedures such as wound dressing. Penthrox is an analgesic used by medical practitioners, the defence forces, ambulance paramedics, sports clubs and surf lifesavers to administer emergency pain relief through inhaler devices known as "Green Whistles".

Penthrox® has received Regulatory Approvals in a number of major jurisdictions worldwide, and is expected to be ubiquitously available in disposable, single-use inhaler devices allowing patients (including children) to self-administer the drug under supervision. Current testing is being performed on advanced inhalers for the self-administration of Penthrox® to be marketed in addition to the Green Whistles. The test inhalers have been developed to be fully integrated pain release systems delivering about 3 ml of Penthrox® to patients in a quick and easy manner. The test inhaler comprises a lock out tab, a plunger that activates the inhaler, and a mouthpiece though which the user can inhale the active Penthrox® composition by normal breathing. Once the lock out tab is removed, the inhaler can be activated by pushing down the plunger. The inhaler would then be set to release the active ingredient through the mouthpiece by the user simply inhaling.

Penthrox® is aimed at becoming available worldwide in facilities that (i) can provide first-aid and emergency services (e.g. hospital emergency, ambulance services, lifesaving clubs, etc.), (ii) necessitate mobile, agile, and point-of-care first-aid and emergency services (e.g. the military), and (iii) can market Penthrox® to the general public (e.g. pharmacies) as a mainstream analgesic of choice.

In some embodiments, the compound of general formula $XClHC-CYF_2$ is $FClHC-CF_3$ and the $C_{1-4}$ alkanol is methanol. In those instances, the process of the invention affords efficient and scalable production of $ClFHC-CF_2OCH_3$ (2-chloro-1,1,2-trifluoroethylmethyl ether). The possibility to produce highly pure and high amounts of $ClFHC-CF_2OCH_3$ can be particularly advantageous, since that compound is a known precursor in the synthesis of the inhalant anaesthetic enflurane (2-chloro-1,1,2-trifluoroethyl-difluoromethyl ether). In accordance to a reaction procedure schematised in Scheme 2 below, enflurane (b) can be synthesised by chlorinating $ClFHC-CF_2OCH_3$ in light (e.g. UV) to give 2-chloro-1,1,2-trifluoroethyldichloromethyl ether (a), followed by substitution of chlorine atoms by fluorine on the dichloromethyl group. The latter is achieved by using, for example, hydrogen fluoride in the presence of antimony(III) chloride, or antimony(III) fluoride with antimony(V) chloride.

Scheme 2 proposed reaction mechanism for production of enflurane from 2-chloro-1,1,2-trifluoroehtylmethyl ether

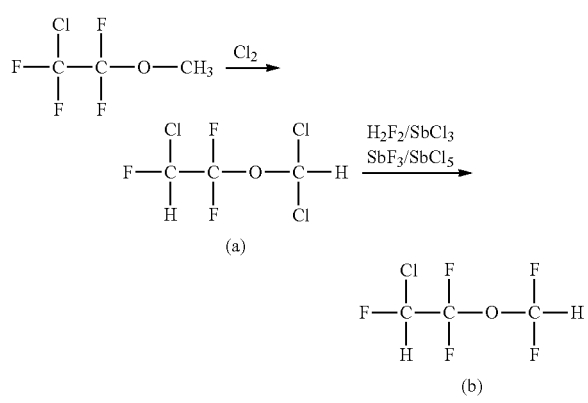

The base may be used in any amount conducive to the formation of the halogenated alkoxyethane. In some embodiments, the base-to-$XClHC-CYF_2$ molar ratio is in the range of 1:0.1 to 1:3. For example, the base-to-$XClHC-CYF_2$ molar ratio is selected from 1:0.1, 1:0.25, 1:0.5:1:0.75, and 1:1. In some embodiments, the base to $XClHC-CYF_2$ molar ratio may be about 1, about 1.1, about 1.2, about 1.5, about 2, or about 5. In some embodiments, the base is used in excess relative to the compound of general formula $XClHC-CYF_2$. By being used in "in excess" relative to the compound of general formula $XClHC-CYF_2$, the base is used in a molar amount that is higher than that of the compound of general formula $XClHC-CYF_2$.

In some embodiments, the base is used in solution with the $C_{1-4}$ alkanol. In those instances, the base/alkanol solution may contain the base in an amount between 1% and 30% by weight relative to the total weight of base and $C_{1-4}$ alkanol. For example, the base may be used in an amount of between about 1% and about 15% by weight, between about 1% and about 15% by weight, or between about 1% and about 5% by weight, relative to the total weight of base and $C_{1-4}$ alkanol. In some embodiments, the base is used in an amount of about 2% by weight relative to the total weight of base and $C_{1-4}$ alkanol. In some embodiments, the base is used in an amount of about 5% by weight relative to the total weight of base and $C_{1-4}$ alkanol. In some embodiments, the base is used in an amount of about 25% by weight relative to the total weight of base and $C_{1-4}$ alkanol.

In the process of the invention, the reaction components flow through the one or more tubular flow line(s) as a reaction mixture. Typically, each reactor component will be provided as a separate component, and the components mixed to form in a reaction mixture. Mixing of the components may be achieved according to any sequence or means suitable to ensure that the components flow through the one or more tubular flow line(s) as a reaction mixture. For example, each component may be provided in corresponding separate reservoirs, from which they are extracted (e.g. pumped) and mixed with the other components to form the reaction mixture. Said mixing may be performed according to any suitable mixing sequence.

In some embodiments, the base and the $C_{1-4}$ alkanol are provided as a solution of the kind described herein in a first reservoir, and the $XClHC-CYF_2$ compound in a second reservoir. In those instances, the reaction mixture is therefore obtained by mixing (i) the solution of the base and the $C_{1-4}$ alkanol extracted from the first reservoir with (ii) the compound of general formula $XClHC-CYF_2$ extracted from the second reservoir. The mixture is subsequently made to flow (e.g. pumped) through the one or more tubular flow line(s). Examples of such arrangements are shown in the schematics of FIGS. 1 and 3, upstream of reactor (2) and the tubular flow line, respectively.

The base/alkanol solution and the $XClHC-CYF_2$ compound may be mixed to form the reaction mixture by any means known to the skilled person.

In some instances, the base/alkanol solution and the $XClHC-CYF_2$ compound are mixed by simply flowing them through lines that interject to form a single flow line, for example in a T- or Y-configuration. In those cases, the resulting single flow line may be the feed of the one or more tubular flow line(s) of the flow reactor.

In other configurations, one of the base/alkanol solution line and the $XClHC-CYF_2$ compound line is fed into the one or more tubular flow line(s) of the flow reactor, and the other of the base/alkanol solution and the $XClHC-CYF_2$ compound is fed into the tubular flow line(s) through an interjecting line. As a result, the base/alkanol solution and the XClHC—CYF$_2$ compound mix to form the reaction mixture. An example of such configuration is shown in FIG. 2, described in more detail further below.

In yet further configurations, the base/alkanol solution and the XClHC—CYF$_2$ compound are mixed in a mixing unit located upstream of the one or more tubular flow line(s). This can advantageously ensure a high degree of mixing between all reaction compounds before they enter into the tubular flow line(s) as a reaction mixture. As a result, fast formation of highly pure halogenated alkoxyethane can be achieved, even in the absence of static mixers within the flow line(s).

The mixing unit may or may not be an integral component of the flow reactor. The mixing unit may be an active mixing unit, in which mixing is achieved by providing external energy. Examples of such units suitable for use in the process of the invention include units that impart time-pulsing flow owing to a periodical change of pumping energy or electrical fields, acoustic fluid shaking, ultrasound, electrowetting-based droplet shaking, micro-stirrers, and the likes. In alternative configurations, the mixing unit may be a passive mixing unit, in which mixing is achieved by combining the base/alkanol solution line and the XClHC—CYF$_2$ compound line into one single line. Examples of such units suitable for use in the process of the invention include Y- and T-type flow junctions, multi-laminating mixers, split-and-recombine mixers, chaotic mixers, jet colliding mixers, recirculation flow-mixers, and the likes. Typical design for passive mixing units include T- and Y-flow configurations, interdigital- and bifurcation flow distribution structures, focusing structures for flow compression, repeated flow division- and recombination structures, flow obstacles within the line, meander-like or zig-zag channels, multi-hole plates, tiny nozzles, and the like. A schematic of an arrangement involving the use of a mixing unit located upstream of the one or more tubular flow line(s) is shown in FIGS. 3(a) and 3(b).

In some embodiments, the one or more tubular flow line(s) comprise an inline static mixer. This is particularly advantageous as the internal cross-sectional area of the flow line(s) increases (for example above 5 mm$^2$). In those instances, diffusion-driven intermixing of the components as they flow through the line (which can be a major driver of mixing in tubular flow line(s) of small internal cross-sectional area) may not be sufficient to promote intimate mixing. A static mixer within the tubular flow line(s) can therefore be implemented to induce multi-lamellation of the flowing fluid or the formation of vortices within the volume of the flowing fluid, thereby increasing mixing efficiency.

Examples of suitable static mixers include baffles, helical mixers, spinning disks, and spinning tubes. As the skilled person will appreciate, the static mixer may be made of any material that is chemically inert to the reaction components, the halogenated alkoxyethane, and any reaction by-product and/or intermediate. Examples of suitable materials in that regard include polyethylene, polypropylene, polyvinyl chloride, a fluorocarbon (e.g. Teflon, polytetrafluoroethylene, polyvinylidene fluoride, fluorinated ethylene propylene, ethylene chlorotrifluoroethylene, polyvinylidene difluoride, a perfluoroalkoxy alkane, etc.), polyether ether ketone, polyethylene, fiberglass-reinforced plastic, Ni-based alloy, or No—Mo-based alloy. The skilled person would be readily capable to identify other materials suitable for use in the static mixer, i.e. a material that is chemically inert to the reaction components, the halogenated alkoxyethane, and any reaction by-product and/or intermediate.

In the process of the invention, the relative amount of the reaction components in the reaction mixture can be modulated by tuning the flow rate of each component when it is mixed with the others. For example, the relative amount of the reaction components in the reaction mixture can be modulated by tuning the flow rate of the base/alkanol solution line relative to that of the XClHC—CYF$_2$ compound line. The ratio between the flow rate of the base/alkanol solution line relative to that of the compound of general formula XClHC—CYF$_2$ line may be any ratio that is conducive to the formation of the halogenated alkoxyethane.

For example, the reaction mixture may be obtained by combining (i) a solution of the $C_{1-4}$ alkanol and the base with (ii) the compound of general formula XClHC—CYF$_2$ according to a flow rate ratio from 1:1 to 10:1. In some embodiments, said flow rate ratio is between 1:1 to 6:1, from 2:1 to 6:1, from 3:1 to 6:1, or from 4:1 to 5:1.

In that context, each of the base/alkanol solution line and the XClHC—CYF$_2$ compound line may be operated at a flow rate that is conducive to the formation of the halogenated alkoxyethane upon mixing of the base/alkanol solution with the XClHC—CYF$_2$ compound. In one embodiment, the flow rate of each individual line is at least 1 ml/min. For example, the flow rate of each individual line may be at least about 5 ml/min, at least about 25 ml/min, at least about 50 ml/min, at least about 100 ml/min, at least about 200 ml/min, at least about 500 ml/min, at least about 1,000 ml/min, at least about 1,500 ml/min, at least about 2,000 ml/min. In some embodiments, the flow rate of each individual line is about 250 ml/min.

In some embodiments, the base/alkanol solution is pumped or otherwise supplied into the mixer unit or the one or more tubular flow line(s) at a flow rate greater than 5 ml/min but less than 2,000 ml/min, and the XClHC—CYF$_2$ compound is pumped or otherwise supplied into the mixer unit or the one or more tubular flow line(s) at a flow rate greater than 5 ml/min but less than 2,000 ml/min. In one embodiment, the base/alkanol solution is pumped or otherwise supplied into the mixer unit or the one or more tubular flow line(s) at a flow rate greater than or equal to 50 ml/min but less than or equal to 500 ml/min, and the XClHC—CYF$_2$ compound is pumped or otherwise supplied into the mixer unit or the one or more tubular flow line(s) at a flow rate greater than or equal to 50 ml/min but less than or equal to 500 ml/min. In one embodiment, the base/alkanol solution is pumped or otherwise supplied into the mixer unit or the one or more tubular flow line(s) at a flow rate of about 250 ml/min, and the XClHC—CYF$_2$ compound is pumped or otherwise supplied into the mixer unit or the one or more tubular flow line(s) at a flow rate of about 50 ml/min.

In the process of the invention, the reaction mixture may flow through the one or more tubular flow line(s) at any flow rate that is conducive to generation of the halogenated alkoxyethane. In some embodiments, the reaction mixture flows through the one or more tubular flow line(s) at a flow rate of at least about 1 ml/min. For example, the reaction mixture may flow through the one or more tubular flow line(s) at a flow rate of at least about 5 ml/min, at least about 25 ml/min, at least about 50 ml/min, at least about 100 ml/min, at least about 250 ml/min, at least about 500 ml/min, at least about 750 ml/min, at least about 1 L/min, or at least about 2 L/min.

The one or more tubular flow line(s) may provide for any internal volume conducive to generation of the halogenated alkoxyethane. For avoidance of doubt, by "internal volume" of the one or more tubular flow line(s) is meant the volume of the internal cavity of the tubular flow line(s) through which the reaction components flow as a reaction mixture. In other words, the "internal volume" of the one or more tubular flow line(s) corresponds to the total volume of fluid present in the tubular flow line(s) at any given time, when the reactor is in operation.

In one embodiment, the one or more tubular flow line(s) has/have a total internal volume of at least 100 mL, at least 250 mL, at least 500 mL, at least 750 mL, at least 1 L, at least 1.5 L, at least 2 L. For example, the one or more tubular flow line(s) may have a total internal volume in the range of 100 ml to 2 L, for example less than or equal to 1 L (and including any integer there between, and/or fraction thereof, for example, 100 ml, 100.1 ml, etc.). In one embodiment the one or more tubular flow line(s) has/have a total internal volume greater than or equal to 200 ml but less than or equal to 600 ml. For example, the one or more tubular flow line(s) may have a total internal volume greater than or equal to 250 ml but less than or equal to 500 ml. In one embodiment, the one or more tubular flow line(s) has/have a total internal volume greater than or equal to 200 ml but less than or equal to 350 ml.

The one or more tubular flow line(s) may be of any length allowing for generation of the halogenated alkoxyethane. The length of the tubular flow line(s) may be selected depending on the internal cross-sectional area and the desired volume for the reaction. In one embodiment the tubular flow line(s) has/have a length greater than or equal to 1 metre but less than or equal to 50 meters (and including any integer there between, and/or fraction thereof, for example, 1 meter, 1.1 meter, 1.15 meter, 1.2 meter, 1.25 meter, and so on). In one embodiment the tubular flow line(s) has/have a length greater than or equal to 5 meters but less than or equal to 25 meters. In another embodiment the tubular flow line(s) has/have a length greater than or equal to 10 meters but less than or equal to 25 meters. In some embodiments, the tubular flow line(s) has/have a length of at least 0.5 meters, at least 1 meter, at least 5 meters, at least 10 meters, or at least 25 meters.

The volumetric residence time of fluid flowing through the one or more tubular flow line(s) can be determined by the ratio of the total internal volume of the tubular flow line(s) to the flow rate of the fluid flowing through the tubular flow line(s). In turn, the latter may be determined by the sum of the flow rate of all reagent component lines converging into the one or more tubular flow line(s). In the process of the invention, the flow reactor may be operated to obtain any residence time of fluid flowing through the one or more tubular flow line(s) that is conducive to generation of the halogenated alkoxyethane. For example, the flow reactor may be operated to provide a residence time of less than about 250 minutes. In some embodiments, the flow reactor is operated to provide a residence time of less than about 200 minutes, less than about 100 minutes, less than about 50 minutes, less than about 25 minutes, less than about 20 minutes, less than about 15 minutes, less than about 10 minutes, less than about 5 minutes, less than about 2.5 minutes, less than about 2 minutes, or less than about 1 minute. In some embodiments, the flow reactor is operated to provide a residence time of about 2 minutes.

The flow reactor in the process of the invention may be operated at any pressure conducive to generation of the halogenated alkoxyethane. For example, in the process of the invention the reaction components may flow through the one or more tubular flow line(s) at a pressure of at least 15 bar. For avoidance of doubt, values of pressure used herein refer to gauge pressure.

In that context, the procedure of the invention advantageously allows for production of halogenated alkoxyethane at significantly lower pressure than conventional procedures. For example, in the process of the invention the reaction components may flow through the one or more tubular flow line(s) at a pressure of less than 30 bar. In some embodiments, the reaction components flow through the one or more tubular flow line(s) at a pressure of less than 20 bar, less than 15 bar, or less than 10 bar. In some embodiments, the reaction components flow through the one or more tubular flow line(s) at a pressure of 10-15 bar. In some embodiments, the reaction components flow through the one or more tubular flow line(s) at a pressure of about 18 bar.

In the process of the invention, the halogenated alkoxyethane forms at least upon the reaction components mixing. The reaction is exothermic and reaction heat can be continuously extracted by any means known to the skilled person. Suitable heat control strategies include the provision of a cooling jacket, a heat exchanger, or a combination thereof in thermal contact with at least a portion of the one or more tubular flow line(s). The jacket can maintain the temperature of the fluid flowing within the flow line(s) by way of a cooling medium provided to the jacket by a cooling line. The cooling medium may be any medium known to the skilled person, for example water, glycol, or a water/glycol mixture. The cooling medium or cooling jacket or heat exchanger may form part of an external casing within which the flow line(s) are located.

In some embodiments, the halogenated alkoxyethane is also formed by heating the reaction mixture to a temperature of up to 140° C. For example, the reaction mixture may be heated to a temperature of up to about 120° C., up to about 100° C., up to about 75° C., up to about 50° C., or up to about 30° C. In some embodiments, the reaction mixture is heated to a temperature of about 120° C. A skilled person would be aware of how to provide heating to the one or more tubular flow line(s) to achieve the required reaction temperature. Suitable heating strategies include the provision of a heating jacket, a heat exchanger, or a combination thereof in thermal contact with at least a portion of the one or more tubular flow line(s).

Heating of the reaction mixture is useful to facilitate the first step of the reaction mechanism, in which the compound of general formula XClHC—CYF$_2$ reacts with the base to form the alkene intermediate. Once the intermediate forms, it almost instantly promotes an addition reaction (exothermic) with the alkanol resulting in the formation of the halogenated alkoxyethane (second step). Downstream cooling may also be employed to cool reaction intermediates and/or the reactor effluent containing the halogenated alkoxyethane. For example, downstream cooling may be employed when the reaction mixture is heated. An example of a suitable set-up in that regard is shown in FIG. 3(b), in which cooling is provided to the effluent downstream of the tubular flow line(s). Accordingly, in some embodiments heating is provided to a first section of the tubular flow line(s), and cooling to a second section of the tubular flow line(s), downstream of the first section. In further embodiments, heating is provided to an initial section of the tubular flow line(s), and cooling is provided to the effluent downstream of the tubular flow line(s). Those arrangements can advantageously optimise the reaction conditions to ensure efficient and high yield conversion of transformation of the compound of general formula XClHC—CYF$_2$ in the halogenated alkoxyethane.

The temperature of any of the reagent component may also be controlled to a desired value. For instance, the base/alkanol solution may be used at room temperature. In some embodiments, the base/alkanol solution is used at a temperature below 10° C., for example below 5° C., or between 0° C. and 5° C. In some embodiments, the XClHC—CYF$_2$ compound is used at room temperature. In some embodiments, the XClHC—CYF$_2$ compound is used at a temperature below 10° C., for example below 5° C., or between 0° C. and 5° C. Accordingly, in some embodiments one or more reagent compound(s) are cooled prior to being mixed to form the reaction mixture, such that the one or more reagent compound(s) is/are in liquid form when the reaction mixture forms. Cooling any of the reagent components may be necessary to ensure they are used in liquid form in the flow reactor. This may be achieved by any means known to the skilled person. For example, reservoirs of either or both the base/alkanol solution and the XClHC—CYF$_2$ compound may be temperature controlled. In some embodiments, either or both the base/alkanol solution and the XClHC—CYF$_2$ compound are provided in corresponding temperature controlled reservoir. Such temperature control may be achieved by cooling strategies of the kind described herein (e.g. cooling jacket, a heat exchanger, or a combination thereof). Alternatively, or at the same time, cooling of one or more reagent component(s) may be achieved by a temperature controlled reservoir pump, for example a pump provided with a cooling system of the kind described herein (e.g. cooling jacket, a heat exchanger, or a combination thereof).

As used herein, "room temperature" refers to ambient temperatures which may be, for example, between 10° C. to 40° C. but is more typically between 15° C. to 30° C. For example, room temperature may be a temperature between 20° C. and 25° C.

In the process of the invention, the halogenated alkoxyethane flows out of the flow reactor in a reactor effluent. This may be achieved by any means known to the skilled person. When the flow reactor comprises two or more tubular flow lines, the lines would typically converge to form a single outlet from which the effluent exits the reactor. The effluent may exit the reactor at a flow rate that depends on the operational parameters of the reactor. For example, the reactor effluent containing the halogenated alkoxyethane may exit the reactor at a flow rate of at least 5 ml/min. In some embodiments, the reactor effluent containing the halogenated alkoxyethane exits the reactor at a flow rate of at least 10 ml/min, at least 25 ml/min, at least 50 ml/min, at least 100 ml/min, at least 250 ml/min, at least 500 ml/min, at least 750 ml/min, at least 1 L/min, at least 1.5 L/min, or at least 2 L/min.

The effluent may contain an amount of halogenated alkoxyethane that is dependent on the operational parameters of the reactor. In some embodiments, the reactor effluent contains at least 70% by volume, at least 80% by volume, at least 90% by volume, or at least 95% by volume of the halogenated alkoxyethane. Advantageously, the process of the invention affords higher conversion yields than conventional procedures. Accordingly, in some embodiments the reactor effluent contains at least 90% by volume of the halogenated alkoxyethane.

In some embodiments, the process also comprises a step of mixing the reactor effluent with a polar solvent. For example, the process may comprise a step of mixing the reactor effluent with water. This may provide a biphasic mixture which can be used in the context of the purification procedure described herein. The polar solvent (e.g. water) may be mixed with the reactor effluent by any of the mixing procedures described herein. For example, one or more lines carrying the polar solvent (e.g. water) from a reservoir may be made to interject the reactor effluent line, and the polar solvent made to flow (e.g. pumped) from a dedicated reservoir. Alternatively, the polar solvent (e.g. water) may be mixed with the reactor effluent by way of a mixing unit of the kind described herein.

The polar solvent (e.g. water) may be provided according to any flow rate that is suitable to obtain a biphasic mixture with the reactor effluent. In some embodiments, the polar solvent (e.g. water) is provided according to a flow rate of at least 5 ml/min, at least 25 ml/min, at least 50 ml/min, at least 100 ml/min, at least 250 ml/min, at least 500 ml/min, at least 750 ml/min, at least 1,000 ml/min, at least 1,500 ml/min, at least 2,000 ml/min, at least 2,500 ml/min, at least 3,000 ml/min, at least 4,000 ml/min, or at least 5,000 ml/min. In some embodiments, the polar solvent (e.g. water) is provided according to a flow rate greater than or equal to 5 ml/min but less than or equal to 5,000 ml/min. For example, the polar solvent (e.g. water) may be provided according to a flow rate selected from an integer in the range 5 ml/min to 500 ml/min, for example in the range 25 ml/min to 250 ml/min. In some embodiments, the polar solvent (e.g. water) is provided according to a flow rate of 250 ml/min. In some embodiment, the polar solvent (e.g. water) may be provided at any pressure that is suitable for effective mixing with the reactor effluent. For example, the polar solvent (e.g. water) may be pumped at a pressure of >15 bar. In some instances, the polar solvent (e.g. water) may also be pumped at a pressure of <15 bar. In some embodiments, the polar solvent (e.g. water) may be pumped at a pressure of 10-15 bar. Typically, the polar solvent (e.g. water) may be pumped at room temperature.

The reactor effluent may also contain additional compounds present in the effluent as impurities. Depending on the reactor conditions and/or the nature of the reaction components, said impurities may comprise one or more reaction by-product(s) and/or one or more unreacted reaction component. The nature of the impurities depends on the reaction conditions and/or the nature of the reaction components. For example, when the process of the invention is performed to produce methoxyflurane, the impurities may comprise methanol, 2,2-dichloro-1,1,1-trifluoroethane, ethers (for example vinyl ethers such as methoxyethene, 1,1-dichloro-2-fluoro-2-methoxyethene), methyl dichloroacetate, chloroform, and/or HF.

Depending on the reactor conditions and/or the nature of the reaction components, said impurities may also be present in an amount that can range from less than 5% up to about 30% by volume of the effluent. Advantageously, the process of the invention can ensure that the halogenated alkoxyethane can be produced at a significantly higher purity (i.e. above 90% by volume of effluent) relative to conventional synthesis procedures. In some embodiments, the reactor effluent contains less than 5% impurities by volume.

If necessary, as part of the process of the invention, the halogenated alkoxyethane exiting the flow reactor in the effluent may be subject to purification. These may conveniently be achieved by subjecting the reactor effluent to an in-line purification technique (i.e. whereby the purification technique is integrated into the process).

Accordingly, in some embodiments the process of the invention further comprises a purification procedure that comprises the steps of a) mixing the reactor effluent with a polar solvent (e.g. water) to induce phase separation between a polar phase and an organic phase comprising the halogenated alkoxyethane, b) separating the organic phase from the polar phase, c) treating the organic phase with an amine, d) washing the organic phase with an acid solution, e) desiccating the organic phase, and f) distilling the organic phase to obtain a purified distillate comprising the halogenated alkoxyethane.

The purification procedure may be in-line, in which case the reactor effluent is subject to the purification procedure downstream of the flow reactor. By including an in-line purification procedure, the process of the invention advantageously provides for the continuous production of purified halogenated alkoxyethane. Alternatively, the purification procedure may be performed separately, in which case the reactor effluent would be initially collected upon exiting the flow reactor with no further processing, optionally stored, and subsequently purified.

The polar solvent used in step a) of the purification procedure may be any polar solvent that can induce phase separation of the effluent between a polar phase and an organic phase that comprises the halogenated alkoxyethane. For example, the polar solvent may be water. A skilled person would be capable to identify other polar solvents suitable for this purpose.

Separation of the organic phase from the polar phase may be effected according to any means known to the skilled person. For example, separation of the organic phase from the polar phase may be effected by way of a gravity separator (e.g. a phase separation tank), a super-hydrophobic mesh, a super-oleophobic mesh, and the like. A skilled person would be capable to identify suitable means and procedures for the effective separation of the organic phase from the polar phase for the purpose of this step.

In step c) of the purification procedure, the organic phase comprising the halogenated alkoxyethane is treated with an amine. Typically, the organic phase would be treated with excess amine. Depending on the nature of the impurities, the amine may be a primary or a secondary amine. Examples of suitable amines for this purpose include ethylenediamine (1,2-diamnoethane), 1,3-diaminopropane, diethylenetriamine, di-n-propylamine, n-butylamine, ethanolamine, pyrrolidine, 2-aminobutane, and a mixture thereof. In some embodiments, the amine is selected from ethylenediamine, 1,3-diaminopropane, diethylenetriamine, and a mixture thereof.

Step c) may be performed as a batch procedure or as a continuous flow procedure. In some embodiments, step c) is performed as a continuous flow procedure.

In addition, step c) may be performed at any temperature that is conducive to effective removal of the impurities. For example, step c) may be performed at a temperature between 15° C. to 150° C. In some embodiments, step c) is performed at room temperature. In some embodiments, step c) is performed at a temperature up to 120° C.

The amine may be used in any amount conducive to effective removal of the impurities. Typically, the amine will be used in an amount at least equivalent to the volume of reactor effluent containing the halogenated alkoxyethane. In some embodiments, the amine is used in a volume amount equivalent to the volume of reactor effluent containing the halogenated alkoxyethane. In some embodiments, the amine is used in an excess volume relative to the volume of reactor effluent containing the halogenated alkoxyethane. For example, the amine may be used in a volume amount up to 10% the volume of reactor effluent containing the halogenated alkoxyethane.

The use of an amine in the purification procedure has surprisingly be found effective for obtaining pharmaceutical grade halogenated alkoxyethane (e.g. 99.9%). In that regard, the amine is particularly effective for efficient removal of impurities while remaining inert towards the halogenated alkoxyethane. For example, in the purification procedure for obtaining pharmaceutical grade methoxyflurane the use of an amine of the kind described herein is particularly effective for the selective removal of low component impurity (e.g. methyl dichloroactetate) while retaining methoxyflurane. This has been found to be particularly advantageous for the synthesis of methoxyflurane with purity above 99%, for example up to 99.9% purity.

Based on the above, it is therefore believed that the treatment of the reactor effluent (or an organic phase thereof) with an amine may be unique and advantageous on its own right. Accordingly, in some embodiments the method of the invention further comprises a purification step in which the reactor effluent, or an organic phase derived from the reactor effluent and containing the halogenated alkoxyethane, is treated with an amine. The amine may be an amine of the kind described herein. Depending on the nature of the impurities, the amine may be a primary or a secondary amine. Examples of suitable amines for the purpose of these embodiments include ethylenediamine (1,2-diamnoethane), 1,3-diaminopropane, diethylenetriamine, di-n-propylamine, n-butylamine, ethanolamine, pyrrolidine, 2-aminobutane, and a mixture thereof. In some embodiments, the amine is selected from ethylenediamine, 1,3-diaminopropane, diethylenetriamine, and a mixture thereof. In these instances, the purification step may be performed at any of the purification conditions described herein. For example, when the method of the invention further comprises a purification step in which the reactor effluent, or an organic phase derived from the reactor effluent and containing the halogenated alkoxyethane, is treated with an amine, the amine may be used in a volume amount up to 10% the volume of the portion of the reactor effluent containing the halogenated alkoxyethane. Also, when the method of the invention further comprises a purification step in which the reactor effluent, or an organic phase derived from the reactor effluent and containing the halogenated alkoxyethane, is treated with an amine, the treatment with amine may be performed at any temperature that is conducive to effective removal of the impurities. For example, when the method of the invention further comprises a purification step in which the reactor effluent, or an organic phase derived from the reactor effluent and containing the halogenated alkoxyethane, is treated with an amine, the treatment with amine may be performed at a temperature between 15° C. to 150° C. In some embodiments, said treatment with amine is performed at room temperature. In some embodiments, said treatment with amine is performed at a temperature up to 120° C. Advantageously, when the method of the invention further comprises a purification step in which the reactor effluent, or an organic phase derived from the reactor effluent and containing the halogenated alkoxyethane, is treated with an amine, the halogenated alkoxyethane can be obtained at a purity above 99%, for example up to 99.9% purity.

In step d) of the purification procedure, following treatment with excess amine the organic phase is washed with an acid solution. This ensures effective removal of impurities such as vinyl ether, which would typically form when the process is used to produce methoxyflurane. The acid solution may be an aqueous acid solution. The acid used in the acid solution may be any acid effective to remove impurities such as vinyl ether. Examples of suitable acids for use in the purification procedure include hydrochloric acid, sulfuric acid, *sulphurous* acid, methanesulfonic acid, trifluoromethanesulfonic acid, phosphoric acid, acetic acid, trifluoroacetic acid, nitric acid, nitrous acid, hypochlorous acid, chlorous acid, chloric acid, perchloric acid, and a combination thereof. In one embodiment, the acid is methanesulfonic acid (MSA). In some embodiments, the acid solution is at least a 10%, at least a 20%, at least at 30%, or at least a 40% acid solution. The organic phase may be washed with any effective amount of acid solution. For example, the acid solution may be added to the organic phase according to a 0.25:1, 0.5:1, 1:1, or 2:1 volume ratio (acid solution to organic phase).

Desiccation of the so formed organic phase in step c) of the purification procedure may be effected according to any means known to the skilled person.

The purification procedure further includes a step of distilling the desiccated organic phase. This may be effected according to any means known to the skilled person.

In some embodiments, the purification procedure comprises the addition of an oxidizing agent. Said oxidising agent has been found to be effective in the removal of impurities such as vinyl impurities (e.g vinyl ether). The oxidising agent may therefore be used in addition, or as an alternative, to the acid solution. Accordingly, in some embodiments the process of the invention further includes a purification procedure that comprises the steps of a) mixing the reactor effluent with a polar solvent to induce phase separation between a polar phase and an organic phase comprising the halogenated alkoxyethane, b) separating the organic phase from the polar phase, c) treating the organic phase with an amine, d) washing the organic phase with an oxidizing agent, e) desiccating the organic phase, and f) distilling the organic phase to obtain a purified distillate comprising the halogenated alkoxyethane. Any oxidising agent that is effective in the removal of impurities such as vinyl ether may be used in the purification procedure. Examples of suitable oxidizing agents include oxygen, ozone, oxone (with or without water), a peroxide, a hydroperoxide, a hypochlorite (e.g. sodium hypochlorite), and a mixture thereof.

The organic phase may be left to react with the acid solution and/or the oxidising agent for any length of time that is effective to ensure that impurities such as vinyl ether are no longer detectable by gas chromatography. For example, the organic phase may be left to react with the acid solution and/or the oxidising agent for a length of time there is sufficient to reduce purities, such as vinyl ether, to below 0.01% by weight. In some embodiments, the organic phase is left to react with the acid solution and/or the oxidising agent for at least 1, at least 2, at least 5, at least 10, at least 24, at least 48, or at least 72 hours.

By way of example, an exemplary embodiment of a purification procedure suitable for obtaining methoxyflurane with purity above 99%, for example up to 99.9% purity, follows.

Under certain acid conditions, it was observed that ethane impurities may convert to the corresponding chloroacetates, which may impact the distillation step resulting in formation of further acidic by-product impurities. In turn, this may lead to contamination of the final product by chloroacetates. To protect against such eventuality, fractional distillation of the may be performed in the presence of a suitable non-volatile, weakly basic material to trap any acidic by-products that may be formed. For example, such materials could be selected from polymeric materials (e.g. polyvinlypyridine), inorganic materials (e.g. basic alumina), and organic materials (e.g. quinolone). A skilled person would be able to readily identify materials that would be suitable for that purpose.

An example set up which may be used to perform the process of the invention is shown in the schematics of FIG. 1. Apparatus (1) is made of a flow reactor (2), within which the one or more tubular flow line(s) is/are located (see for example FIG. 2). Apparatus (1) includes reservoir (7), within which the base/alkanol solution (5) can be stored, and reservoir (8), within which the XClHC—CYF$_2$ compound (6) can be stored. In the schematics, reservoir (8) is represented in the form of an inverted gas cylinder, which may be used to store gaseous XClHC—CYF$_2$ compound, if needed. Alternatively, reservoir (8) may be a liquid tank for XClHC—CYF$_2$ compound that is in liquid form at the temperature it is stored. Individual pumps (3) and (4) extract the base/alkanol solution (5) and the XClHC—CYF$_2$ compound (6) and pump them into flow reactor (2) through lines (14) and (15), respectively. In the schematics, cooling jackets (9) and (10) are used to cool the reaction components to below room temperature, for example to about 5° C., by means of a cooling medium which can be delivered from cooling medium chiller unit (11) through pump jacket cooling lines (12). In the schematics, cooling medium chiller unit (11) is also shown to be connected to the flow reactor (2). Back-pressure system (13) may be operated between an open and closed position to set a desired pressure within the one or more tubular flow line(s).

During operation, the base/alkanol solution (5) and the XClHC—CYF$_2$ compound (6) enter flow reactor (2) via inlet ports (19) and (18), respectively. Once inside, they are mixed to form the reaction mixture by having their respective lines interject (as shown in more detail in the schematic of FIG. 2). The reactor effluent containing the halogenated alkoxyethane exits flow reactor (2) via outlet port (20), and may be mixed with water stored in reservoir (17) and pumped by pump (16) through line (21). The mixture of the reactor effluent and water can then flow through static mixer (22), and the mixture collected for further purification from line (23).

FIG. 2 shows a cut-away side view of an exemplary embodiment flow reactor suitable for use in the process of the invention. One of the base/alkanol solution and the XClHC—CYF$_2$ compound is fed, for example pumped, at an end of a tubular flow line through inlet (25).

The other of the base/alkanol solution and the XClHC—CYF$_2$ compound is fed, for example pumped, through inlet (26) into a line that interjects the tubular flow line at a mixing port (MP). As a result, the base/alkanol solution and the XClHC—CYF$_2$ compound mix to form the reaction mixture, which flows downstream of the mixing port through the coiled tubular flow line (27). Casing (28) may be filled with a cooling medium (for example chilled water) that can be introduced through port (29). The halogenated alkoxyethane forms along the flow line as the mixture flows through it, and an effluent containing the halogenated alkoxyethane can be collected from outlet (30). The effluent can subsequently be mixed with water provided through line (31) in static mixer (32). The reactor may comprise one or more temperature probes (TP), a mixing port (MP), a pressure transducer (PT) and/or back pressure regulatory (BPR).

Advantageously, the process of the invention can be efficiently scaled-up for commercial-scale production of the halogenated alkoxyethane. This may be achieved, for instance, by increasing the number of tubular flow lines in the flow reactor. Since the internal geometry of each flow line is maintained, and the reaction conditions remain identical within each flow line, the process can be adapted to produce higher amounts halogenated alkoxyethane with minimal re-optimization of the reaction conditions. This advantageously ensures fast and seamless transfer from lab-scale testing to production. A skilled person would be able to readily scale-up the proposed method based on the present disclosure.

Specific embodiments of the invention will now be described with reference to the following non-limiting examples.

EXAMPLES

Example 1

2,2-Dichloro-1,1,1-trifluoroethane ($Cl_2HC$—$CF_3$, or HCFC-123) and a solution of tetramethylammonium hydroxide in methanol (25 wt %) were independently pumped through a static (turbulent) mixer maintained at ambient temperature to ensure complete mixing in the minimum amount of time, in accordance to a setup outlined in the schematic of FIG. 3.

The mixed (homogeneous) solution then moves into the flow reactor where it is heated to a reaction temperature of 120° C. The reactor is operated to provide a residence time (RT) of about 1 minute. It was observed that under these conditions the formation of by-products derived from the subsequent reactions of methoxyflurane can be minimised.

Upon exiting the flow reactor the mixture cools to ambient temperature and is mixed with water, providing a mixture that can be collected separately. The collected mixture was let to phase-separate into an aqueous phase and an organic phase. The phases were then subsequently separated and the aqueous phase discarded. The organic phase (containing methoxyflurane) was then treated with excess amine (tested amines were ethylenediamine, 1,3-diaminopropane, and diethylenetriamine), followed by washing with aqueous citric acid solution, and desiccation with magnesium sulfate. The final product is obtained upon fractional distillation.

Figure 4:
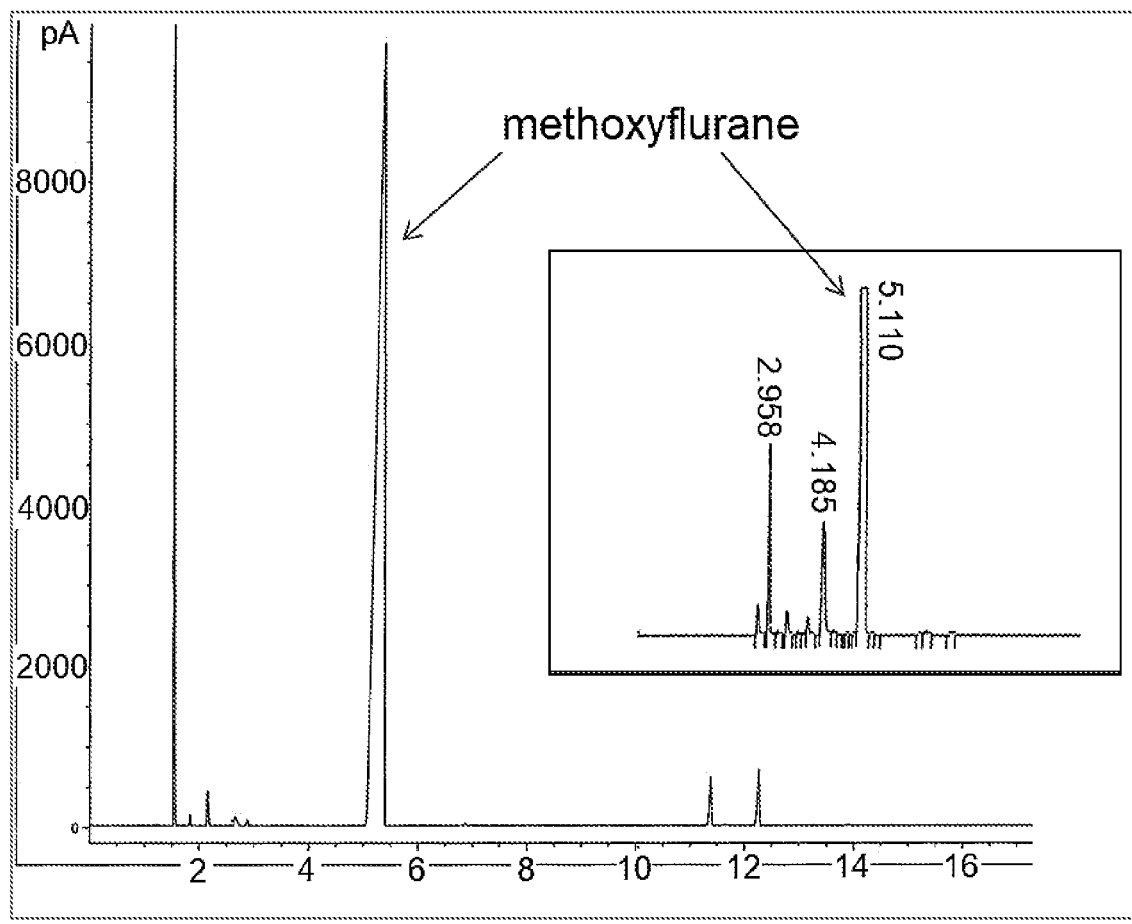
FIG. 4 shows gas chromatography spectrum of a methoxyflurane product obtained following the acid, desiccation, and distillation steps (main plot) compared to a gas chromatography spectrum (inset) of the corresponding effluent/water mixture immediately after the amine wash (i.e. before the acid, desiccation, and distillation steps), as described in Example 1.

Gas chromatography spectra obtained before and after purification are shown in FIG. 4. The figure shows a gas chromatography spectrum of a methoxyflurane product obtained following the acid, desiccation, and distillation steps (main plot) compared to a gas chromatography spectrum (inset) of the corresponding effluent/water mixture immediately after the amine wash (i.e. before the acid, desiccation, and distillation steps).

Precise metering of reagent components (HCFC-123 and 25 wt % solution of tetramethylammonium hydroxide in methanol) was performed. To that effect, the base/alkanol solution was metered using standard HPLC pumps (dual piston, positive displacement pumps) with no effort. The precise metering of HCFC-123 (which boils above 28° C.) was not perfumed with standard HPLC pumps, which showed significant losses and inconsistent operation. For HCFC-123, precision syringe pumps with cooling jacket and operating in continuous mode (dual pump assembly) were employed. This afforded precise metering of low boiling HCFC-123.

A $^{19}F$ NMR study of this process showed that methoxyflurane forms according to a 2-step mechanism, both steps occurring at the tested room temperature (25° C.) immediately upon mixing of the two reagents (HCFC-123+ tetramethylammonium hydroxide in methanol). The two steps are believed to proceed through fast formation of a 1,1-dichloro-2,2-difluoroethene intermediate (as shown in the schematic below) through dehydrogenation and dehalogenation of $C_1$ and $C_2$ carbons of HCFC-123, respectively. The C=C intermediate was observed to almost instantly convert into the reaction product (methoxyflurane) methanol addition, as shown in Scheme 3 below.

Scheme 3 Proposed 2-step reaction mechanism of methoxyflurane from HCFC-123

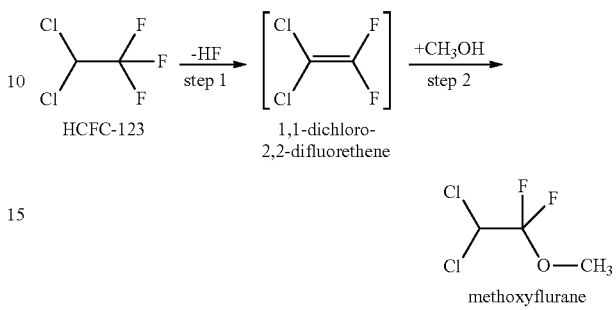

The rate determining step (i.e. the slowest step in the overall process) was observed to be the initial HF elimination process (step 1) as formation of the intermediate 1,1-dichloro-2,2-difluoroethene could not be observed by $^{19}F$ NMR. The rapidity of the overall process has implications on the way in which this process should be conducted to ensure optimal conversion and purity as it is known that methoxyflurane is more reactive that HCFC-123 toward tetramethylammonium hydroxide and therefore subject to further reactions.

Example 2

In accordance with the general procedure described in Example 1, a number of synthesis procedures were conducted varying numerous process parameters, as outlined in the Table below.

| Bases | Solvents | Reactant Ratios (HCFC-123: Base) | Reaction Conditions (° C.; Min) |
| --- | --- | --- | --- |
| Sodium hydroxide | Methanol/water | 1:1-3:1 | 80-130; 1-120 |
| Potassium hydroxide | Methanol/water | 1:1-3:1 | 80-130; 1-120 |
| Sodium methoxide | Methanol/water | 1:1-3:1 | 80-130; 1-120 |
| Potassium methoxide | Methanol | 1:1-3:1 | 80-130; 1-120 |
| Tetrabutylammonium hydroxide | Methanol/water | 1:1-3:1 | 80-130; 1-120 |
| Benzyl(trimethyl)ammonium hydroxide | Methanol/water | 1:1-3:1 | 80-130; 1-120 |
| Tetraethylammonium hydroxide | Methanol* | 1:1-3:1 | 80-130; 1-120 |
| Tetramethylammonium hydroxide | Methanol* | 1:1-3:1 | 80-130; 1-120 |

*These solutions may contain minor amounts of water consistent with their method of manufacture.

The mechanism postulated for the overall process is illustrated by the schematic of Scheme 4 below, relating to the use of tetramethylammonium hydroxide as the base in methanol. (tetramethylammonium hydroxide is abbreviated in some of the figures set out below to "$Me_4N^+OH^-$"; similarly, methanol is abbreviated in some of the figures set out below to "MeOH").

Scheme 4 Proposed mechanism for the formation of methoxyflurane from 2,2-dichloro-1,1,1-trifluoroethane, tetramethylammonium hydroxide, and methanol

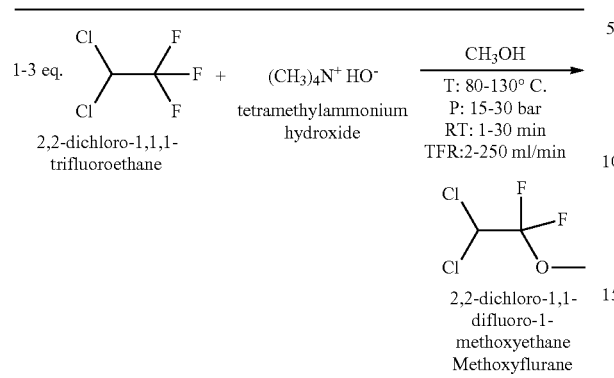

Scheme 5 Postulated mechanism of main 2-step reaction for production of methoxyflurane

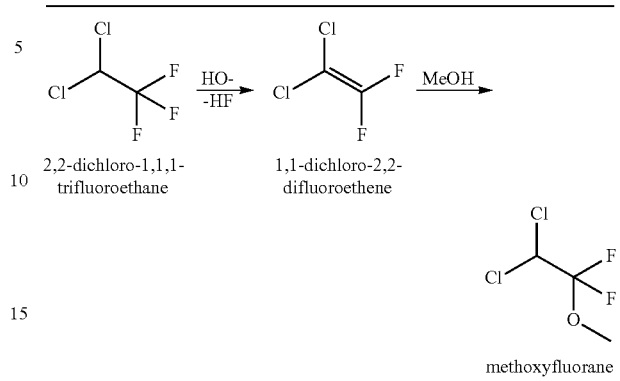

The mechanism is based to the use of 2,2-dichloro-1,1,1-trifluoroethane (1 to 3 molar equivalents) and solutions of tetramethylammonium hydroxide in methanol solution (25 to 40 wt %, 1 molar equivalent), and is carried out using the continuous flow processing set-up illustrated in FIG. 3. The reactants 2,2-dichloro-1,1,1-trifluoroethane and tetramethylammonium hydroxide in methanol are pumped separately and then combined into a single stream through a suitable mixer (for example a T-shaped mixer), before being passed through a suitable static (turbulent or laminar) mixer at ambient temperature to ensure homogeneity (i.e. complete mixing).

The resulting homogeneous reactant stream is then passed through a heated flow reactor (80-130° C.) where the production of methoxyflurane takes place. It must be noted that incomplete mixing prior to entry into the heated flow reactor led to less satisfactory results.

The flow reactor was operated to provide residence times (RT) of 1-30 minutes, during which time the consumption of the tetramethylammonium hydroxide was observed to be substantially complete. The hot reaction stream was then cooled to ambient temperature, combined with water or aqueous acidic stream, and then collected as a biphasic mixture.

Figure 5:
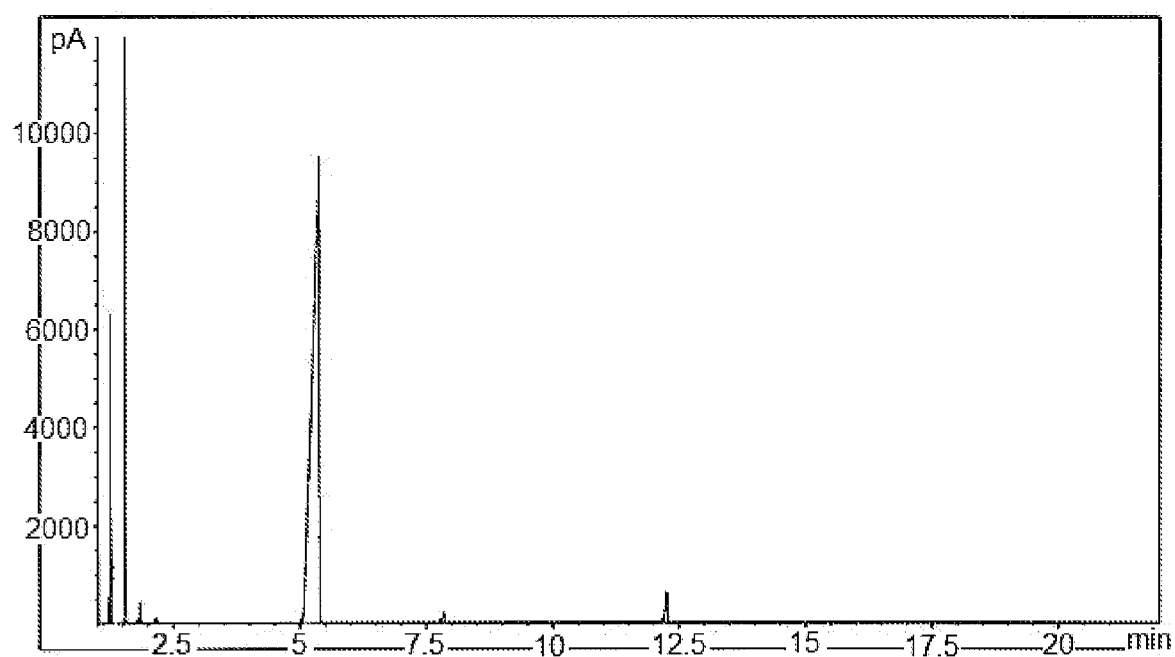
FIG. 5 shows gas chromatography spectrum of a crude methoxyflurane product collected from the flow reactor effluent according to an embodiment of the present invention, and as described in Example 2.

This mixture was then separated (aqueous phase is discarded) and dried using an inorganic desiccant, typically magnesium sulfate, thereby providing crude methoxyflurane. The GC trace displayed in FIG. 5 is representative of the crude methoxyflurane produced.

A $^{19}$F NMR study of this process (as postulated in the schematic above) shows that both steps can proceed at ambient temperature (25° C.) upon mixing of 2,2-dichloro-1,1,1-trifluoroethane and 25 wt % tetramethylammonium hydroxide solution in methanol. The study also confirms that the rate-determining step (i.e. the slowest step in the overall process) is the initial step, in which HF is eliminated. In that regard, $^{19}$F NMR did not reveal detectable presence of 1,1-dichloro-2,2-difluoroethene intermediate.

Scheme 5 below provides a more comprehensive account of the various transformations that may be postulated to take place in the main 2-step reaction mechanism leading to formation of methoxyflurane.

Scheme 6 below shows the postulated mechanisms involving formation of impurities through further reactions of methoxyflurane.

Scheme 6 Postulated mechanism of formation of impurities from methoxyflurane

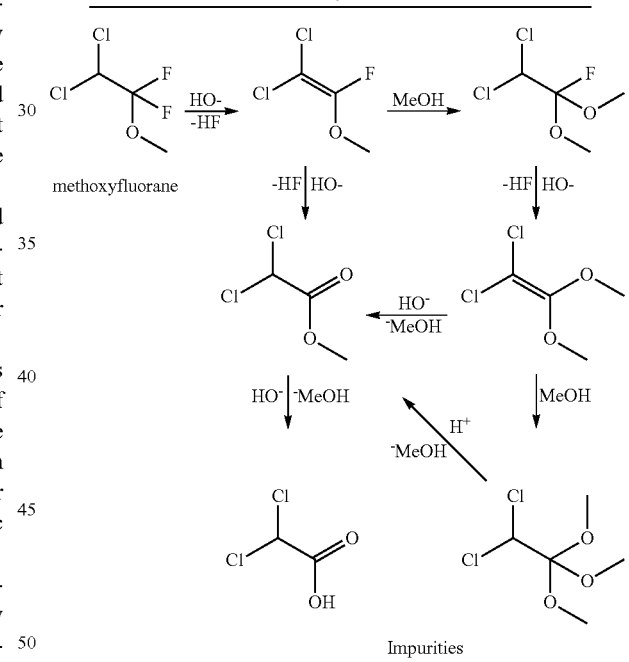

Example 3

Upon separation and desiccation of the biphasic mixture obtained from Example 2, the crude methoxyflurane solution was chemically treated to remove impurities. Due to the nature of the impurities, their direct removal through fractional distillation alone was observed not to be sufficiently effective.

Accordingly, the crude methoxyflurane solution obtained from Example 2 was treated with either a primary or secondary amine, for example, ethylenediamine (1,2-diaminoethane), 1,3-diaminopropane, diethylenetriamine, di-n-propylamine, n-butylamine, ethanolamine, pyrrolidine, or 2-aminobutane. These treatments were performed using either batch or continuous flow conditions at ambient or elevated (up to 120° C.) temperatures. This treatment typically requires an equivalent or excess quantity of amine (up to 10% by volume of the crude methoxyflurane volume).

Figure 6:
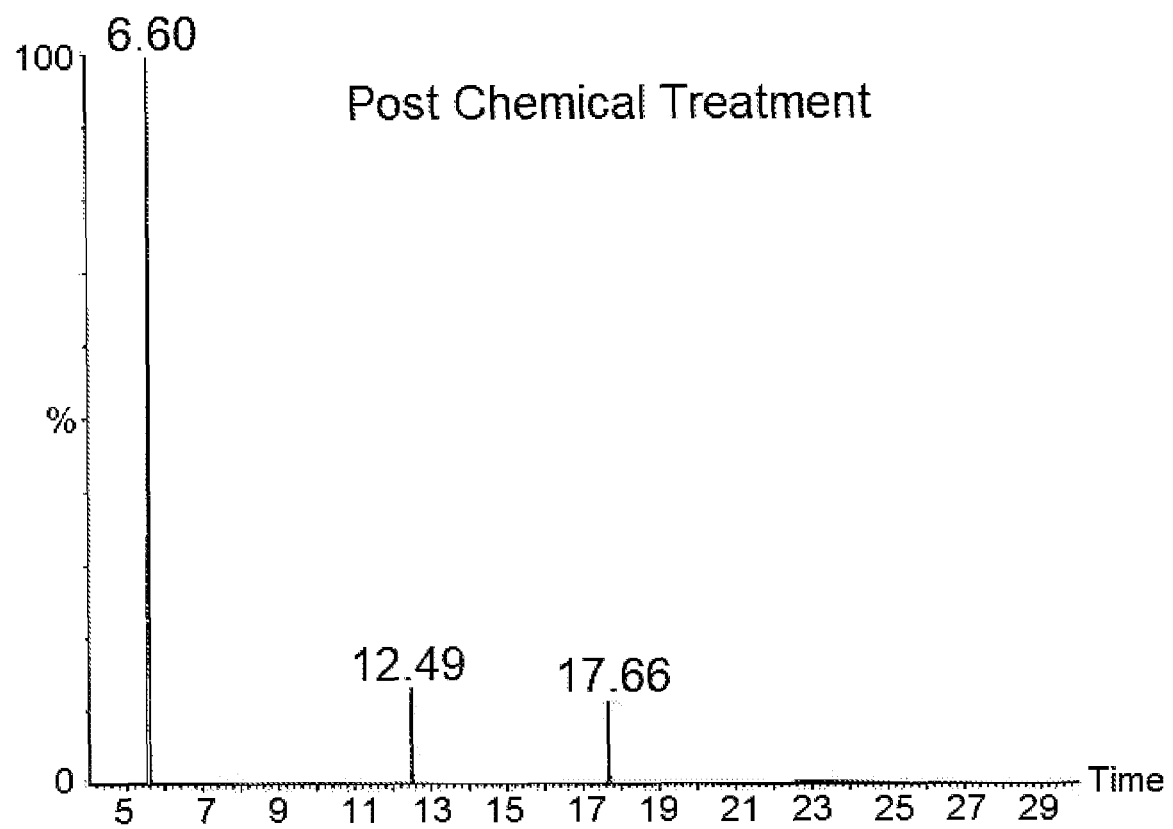
FIG. 6 shows gas chromatography spectrum of a purified methoxyflurane product obtained according to an embodiment purification procedure described in Example 3.

The progress of the amine treatment was monitored by gas chromatography (GC). When judged to be complete, the amine containing reaction mixture is then suitably treated (washed) with an aqueous acidic solution, for example an aqueous citric acid solution, followed by desiccation with a suitable inorganic desiccant (such as magnesium sulfate, or equivalent), thereby producing a crude material suitable for fractional distillation. The GC-MS trace (FIG. 6) is representative of the methoxyflurane produced post such chemical treatment.

The schematic of Scheme 7 below provides a postulated mechanism route of the chemical treatment process described in this Example, leading to the removal of 1,1-dichloro-2-fluoro-2-methoxyethene (vinyl ether), and methyl dichloroacetate impurities. The reaction of 1,1-dichloro-2-fluoro-2-methoxyethene (vinyl ether) with primary and secondary amines can proceed through N-methylation, providing 2,2-dichloroacetyl fluoride in the case 1,1-dichloro-2-fluoro-2-methoxyethene. Both 2,2-dichloroacetyl fluoride and methyl dichloroacetate may react further with primary and secondary amines (amidation) to produce the corresponding dichloroacetamides.

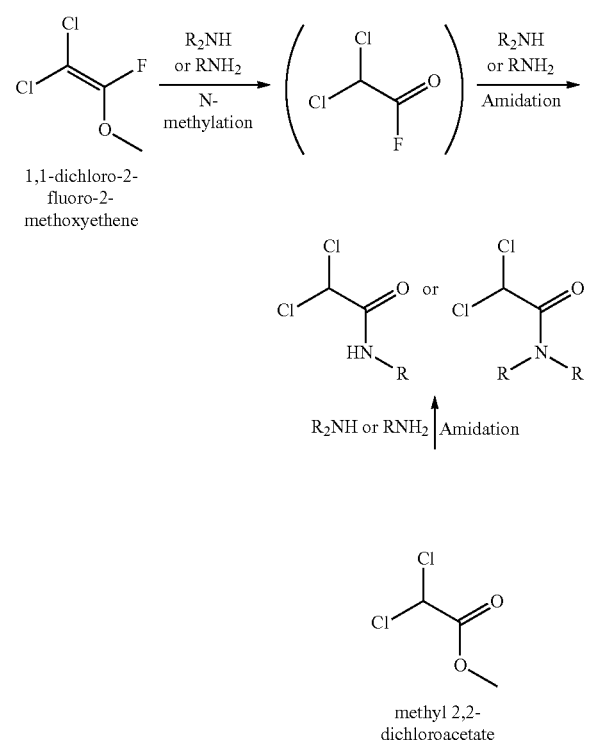

Scheme 7 postulated mechanism route of the chemical removal of 1,1-dichloro-2-flouro-2-methoxyethene (vinyl ether), and methyl dichloroacetate impurities.

It was also noted that under certain acidic conditions the by-product 2,2-dichloro-1,1,1-timethoxyethane may be converted to methyl dichloroacetate as summarised in Scheme 8 below.

Scheme 8 Conversion of 2,2-dichloro-1,1,1-trimethoxyethane to methyl dichloroacetate

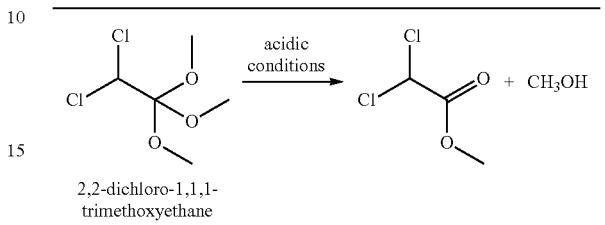

This observation has implications in relation to the fractional distillation step, whereupon this conversion can take place upon generation of acidic by-products during the distillation process. This complicating feature may lead to contamination of the final product by methyl dichloroacetate. To protect against this eventuality, fractional distillation of the crude methoxyflurane may need to be performed in the presence of a suitable non-volatile, weakly basic material to trap any acidic by-products that may be formed. It is expected that should such materials be required, or desirable, that such materials could be usefully selected from the following classes: polymeric materials, for example polyvinlypyridine, or inorganic materials, for example basic alumina, or organic materials, for example quinoline, and other like reagents.

Example 4

Using an apparatus setup of the kind described in Example 1, a number of reactions were performed using different process parameters, as listed in Table 1 below. Specific parameters of the flow reactor and respective tubular flow lines were as follows.

Total internal volume of tubular flow lines: 100 mL

Individual tubular flow line diameter (internal): ¼ inch (6.35 mm)

Tubular flow lines arrangement: 4×3 linear array

Static mixer (located in the flow reactor): Yes

Tubular flow lines Heating Jacket: Yes>100° C.

Process parameters and composition of the reactor effluent, determined by gas chromatography performed on the reactor effluent, are detailed in Table 1 below. A number of tests were performed at different reaction temperature in the range of 115-130° C., and operating the flow reactor to provide a residence time of about 2.22 minutes.

TABLE 1

Percentage (%) methoxyflurane produced under different reaction conditions from dichloro-trifluoroethane (HCFC-123, i.e. SUVA ®-123 by DuPont)

| Exp. No. | Reaction Temp (° C.) | SUVA ®-123 Flow rate (mL/min) | MeOH Flow rate (mL/min) | Base (in MeOH) | Total flow rate (mL/min) | RT (min) | Percentage (%) methoxyflurane as measured by GC |
|---|---|---|---|---|---|---|---|
| 1 | 115 | 9 | 36 | TMAH (25% w/w) | 45 | 2.22 | 62.93 |
| 2 | 120 | 9 | 36 | TMAH (25% w/w) | 45 | 2.22 | 66.56 |
| 3 | 125 | 9 | 36 | TMAH (25% w/w) | 45 | 2.22 | 66.77 |
| 4 | 130 | 9 | 36 | TMAH (25% w/w) | 45 | 2.22 | 67.12 | where: Exp. No is experiment number;
GC is gas chromatography;
RT is residence time in the conduit system and TMAH is tetramethyl ammonium hydroxide.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Many modifications will be apparent to those skilled in the art without departing from the scope of the present invention.

The invention claimed is:

1. A process for continuous preparation of methoxyflurane, the process comprising a step of introducing in a flow reactor reaction components comprising (i) $Cl_2HC-CF_3$, (ii) a base comprising an alkali metal base cation, an ammonium base cation, or a phosphonium base cation, and (iii) methanol, wherein
   a) the flow reactor comprises one or more tubular flow line(s) through which the reaction components flow as a reaction mixture,
   b) the methoxyflurane is formed at least upon the reaction components mixing, with the so formed methoxyflurane flowing out of the flow reactor in a reactor effluent, and
   c) the base is one that forms a salt soluble in methanol during formation of the methoxyflurane.

2. The process of claim 1, wherein the one or more tubular flow line(s) have an internal cross-sectional area of less than about 115 mm$^2$.

3. A process for continuous preparation of methoxyflurane, the process comprising a step of introducing in a flow reactor reaction components comprising (i) $Cl_2HC-CF_3$, (ii) a base comprising an alkali metal base cation, an ammonium base cation, or a phosphonium base cation, and (iii) methanol, wherein
   a) the flow reactor comprises one or more tubular flow line(s) having an internal cross-sectional area of less than 115 mm$^2$ through which the reaction components flow as a reaction mixture, and
   b) the methoxyflurane is formed at least upon the reaction components mixing, with the so formed methoxyflurane flowing out of the flow reactor in a reactor effluent.

4. The process of claim 3, wherein the base is one that forms a salt soluble in methanol during formation of the methoxyflurane.

5. The process of claim 1, wherein the one or more tubular flow line(s) has/have an internal cross-sectional area of less than 30 mm$^2$.

6. The process of claim 1, wherein the tubular flow lines have a circular internal cross-section with a diameter between 0.1 and 6 mm.

7. The process of claim 1, wherein the one or more tubular flow line(s) has/have a total internal volume in the range of 100 mL to 1 L.

8. The process of claim 1, wherein the reactor effluent containing the methoxyflurane exits the reactor at a flow rate of at least 50 mL/min.

9. The process of claim 1, wherein the flow reactor provides a residence time of less than about 5 minutes.

10. The process of claim 1, wherein the reaction mixture is obtained by mixing (i) a solution of methanol and the base with (ii) $Cl_2HC-CF_3$.

11. The process of claim 1, wherein the mixing is performed by combining (i) a flow of the solution of methanol and the base with (ii) a flow of $Cl_2HC-CF_3$ according to a flow-rate ratio from 1:1 to 10:1.

12. The process of claim 1, wherein the base is used in an amount of between 1% and 30% by weight relative to the total weight of base and methanol.

13. The process of claim 1, wherein the base is selected from sodium hydroxide, potassium hydroxide, sodium methoxide, potassium methoxide, tetrabutylammonium hydroxide, benzyl(trimethyl)ammonium hydroxide, N-methyl-N,N,N-trioctylammonium chloride (Aliquat 336), tetraethylammonium hydroxide, tetramethylammonium hydroxide, and tetramethylphosphonium hydroxide.

14. The process of claim 1, wherein the methoxyflurane is also formed by heating the reaction mixture to a temperature of up to 140° C.

15. The process of claim 1, wherein the one or more tubular flow line(s) are provided in a coiled arrangement.

16. The process of claim 1, further comprising a purification step in which the reactor effluent, or an organic phase derived from the reactor effluent and containing the methoxyflurane, is treated with an amine.

17. The process of claim 1, further comprising a purification procedure that comprises, in the following order, the steps of:
  a) mixing the reactor effluent with a polar solvent to induce phase separation between a polar phase and an organic phase,
  b) separating the organic phase from the polar phase,
  c) treating the separated organic phase with an amine,
  d) washing the organic phase obtained in c) with an acid solution,
  e) desiccating the organic phase obtained in d), and
  f) distilling the organic phase obtained in e) to retrieve a purified distillate comprising the methoxyflurane.

18. The process of claim 16, wherein the amine is selected from ethylenediamine, 1,3-diaminopropane, diethylenetriamine, di-n-propylamine, n-butylamine, ethanolamine, pyrrolidine, 2-aminobutane, and a mixture thereof.

19. The process of claim 17, wherein the amine is selected from ethylenediamine, 1,3-diaminopropane, diethylenetriamine, di-n-propylamine, n-butylamine, ethanolamine, pyrrolidine, 2-aminobutane, and a mixture thereof.

* * * * *